(12) United States Patent
Zhang

(10) Patent No.: US 6,326,706 B1
(45) Date of Patent: Dec. 4, 2001

(54) LINEAR MOTOR COMPRESSOR

(75) Inventor: Wei-Min Zhang, London (GB)

(73) Assignee: Z & D Limited, London (GB)

( * ) Notice: Subject to any disclaimer, the term of this patent is extended or adjusted under 35 U.S.C. 154(b) by 0 days.

(21) Appl. No.: 09/490,160

(22) Filed: Jan. 22, 2000

(51) Int. Cl.$^7$ .................................................. H02K 33/12
(52) U.S. Cl. ................................. 310/12; 310/20; 310/17
(58) Field of Search ................................. 310/12, 13, 14, 310/17, 20, 23, 28, 31; 325/229, 234, 306

(56) References Cited

U.S. PATENT DOCUMENTS

| | | | |
|---|---|---|---|
| 3,891,874 | 6/1975 | Rotors et al. | 310/14 |
| 3,937,600 | 2/1976 | White | 417/416 |
| 4,067,667 | 1/1978 | White | 417/418 |
| 4,404,503 | 9/1983 | Ward et al. | 318/119 |
| 4,533,890 | * 8/1985 | Patel | 335/234 |
| 4,613,285 | 9/1986 | Sato et al. | 417/214 |
| 4,704,553 | 11/1987 | Resnicow | 310/12 |
| 5,296,767 | 3/1994 | Asselin | 310/13 |
| 5,779,455 | 7/1998 | Steiger | 417/418 |

FOREIGN PATENT DOCUMENTS

| | | |
|---|---|---|
| 0238109 | 9/1987 | (EP) . |
| 0343350 | 11/1989 | (EP) . |
| 1196418 | 6/1970 | (GB) . |
| 1539201 | 1/1979 | (GB) . |
| 2266932 | 11/1993 | (GB) . |
| 2299715 | 10/1996 | (GB) . |

\* cited by examiner

Primary Examiner—Nestor Ramirez
Assistant Examiner—Judson H. Jones
(74) Attorney, Agent, or Firm—Samson G. Yu; ACIP International, Inc.

(57) ABSTRACT

A linear motor and/or compressor (10; 100; 300; 500; 600) comprises a housing (20; 120; 311; 511) fitted with a number of electromagnets (40, 40'; 140, 140'; 315, 315', 316; 515a–515c, 635a–635d), a shuttle (50; 150; 350; 550; 650) with a central guide (30, 30'; 130; 356, 356'; 520; 655) for keeping it coaxial with the electromagnets and a suspension mechanism for the shuttle including mechanical spring, gas spring and magnetic spring arrangements. The electromagnets form a number of axially exposed magnetic gaps to interact with axially exposed magnetic gaps formed on the shuttle to cause it reciprocate by push-and-pull forces. A phase difference can be produced between the electromagnets to improve shuttle suspension. The central guide can be made hollow to circulate a coolant to cool the compressor from inside. A multi-stage compression arrangement is formed between the shuttle and the electromagnets so that the compressor can work in a double-acting manner to compress the process fluid progressively for a high pressure output. A further suspension (640,640') can be sued for the stator (630) so as to ensure the machine's vibration-free operation.

31 Claims, 20 Drawing Sheets

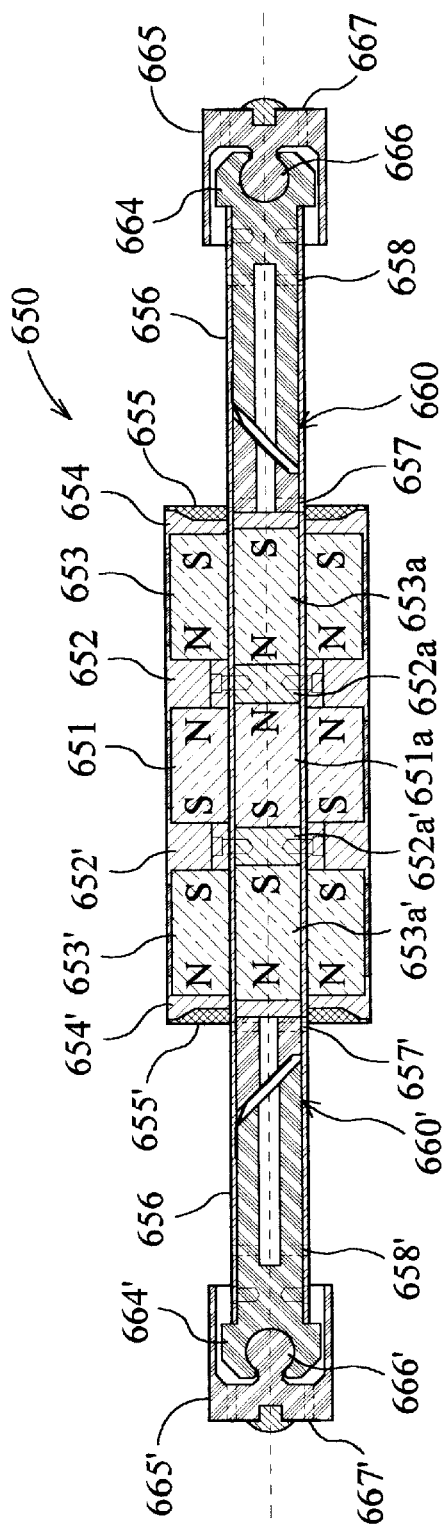
Fig. 19
Fig. 20A
Fig. 20B

LINEAR MOTOR COMPRESSOR

TECHNICAL FIELD OF INVENTION

This invention relates to a linear motor and a compressor incorporating such a motor.

BACKGROUND OF INVENTION

The present invention provides improvements to the invention disclosed in my UK patent no. GB-2299715-B, its disclosure is incorporated herewith by reference.

SUMMARY OF INVENTION

A first object of this invention is to provide a linear motor and/or compressor with improved energy efficiency and more compact and cost effective structure.

According to one aspect of the invention, there is provided a linear motor comprising: a stator having a magnetic arrangement defining a first plurality of axially exposed magnetic gaps; a reciprocating (shuttle) member; and means for energising the stator and/or reciprocating member; wherein the reciprocating member has a magnetic arrangement defining a second plurality of axially exposed magnetic gaps for interacting with the magnetic gaps of said stator.

According to another aspect of the invention, there is provided a linear motor compressor comprising: a housing enclosing an inner space, a stator having a magnetic arrangement defining a first plurality of axially exposed magnetic gaps; a reciprocating member disposed as a free piston in the inner space; valve means for forming at least one fluid passage into and out of said inner space; and means for energising said stator and/or reciprocating member; wherein the reciprocating member has a magnetic arrangement defining a second plurality of axially exposed magnetic gaps for interacting with the magnetic gaps of said stator.

It is advantageous to arrange between the stator and the shuttle a series of magnetic gaps along the shuttle's operating axis so that the diameters of the stator and shuttle can be made small. It is also advantageous to arrange the stator and shuttle's magnetic gaps in an interposed relationship so that it improves not only the push-and-pull driving forces but also electromagnetic suspension effects on the shuttle, therefore improving energy efficiency and reducing working load on suspension springs. Preferably the stator windings are divided into two or more groups and a phase difference is introduced in their currents to further enhance suspension effects.

In case that a stronger driving force is required by a particular application, it can be achieved conveniently by arranging more magnetic gaps along the stator and shuttle structure, forming a longer and more powerful unit. Such a relatively thin and long configuration provides better heat dissipation which is highly beneficial to a high powered unit, especially when it uses temperature sensitive rare earth magnets.

It is preferable that the shuttle member is supported by a central guide to ensure its non-contact movements relative to the stator and to form a clearance seal allowing lubricant-free operation. The central guide can be a hollow shaft extending through said reciprocating member to circulate a coolant fluid through it. Alternatively, the central guide can be formed by a pair of coaxially aligned shafts with pistons carried by the reciprocating member.

It is also preferable to form a multi-stage compression arrangement by dividing the space inside the compressor into pre-compressing and further-compressing chambers so that a process fluid can be compressed stage by stage. Advantageously, an intermediate chamber can be formed to receive compressed fluid from said pre-compressing chamber for intercooling then to supply it to said further-compressing chamber. It is advantageous to arrange second stage compression chambers outside the linear motor structure to improve heat dissipation and energy efficiency.

A further object of this invention is to provide an improved suspension mechanism for a reciprocating member in a linear motor, therefore to make the motor operation more efficient and more reliable.

According to yet another aspect of the invention, there is provided a mechanism for suspending a reciprocating member in a linear motor, wherein said linear motor has a stator with pole means for interacting with pole means on said reciprocating member to cause the latter to reciprocate between two end positions; and wherein said suspension mechanism includes magnetic spring means arranged to interact with the pole means of said reciprocating member so as to generate a return force in response to its movement towards each said end position.

Preferably, said magnetic spring means have a nested permanent magnet structure forming internal flux concentration for acting with said reciprocating member when it enters the structure. Alternatively, said magnetic spring means is formed by an electromagnet with an axially exposed magnetic gap for acting with said reciprocating member.

A further object of this invention is to provide a linear motor with a flux switching arrangement for making the motor operation more efficient.

According to yet another aspect of the invention, there is provided a flux switching mechanism for a linear motor having a stator with pole means defining a plurality of magnetic gaps for interacting with pole means on a reciprocating member, wherein the pole means of said stator incorporate flux switching means for switching magnetic flux towards one axial direction according to the direction of an energising current supplied to the stator so as to improve magnetic linkage between the stator and the reciprocating member.

Preferably the stator pole means also have a pole face extension pattern extending in axial direction to further improve said magnetic linkage.

A further object of this invention is to provide a linear motor and/or compressor with a suspension mechanism for its vibration-free operation.

According to yet another aspect of the invention, there is provided a linear motor and/or compressor having a housing accommodating a stator and a reciprocating (shuttle) member; wherein both said stator and reciprocating member are suspended to make them movable relative to the housing so that when in operation the interaction between the stator and the reciprocating member would cause them to move in opposite directions.

Preferably the stator is suspended by disk spring means which also ensures its precise alignment with the housing. It is advantageous that the disk spring means also act as diaphragm means dividing the space between the stator and the housing into chambers so that the stator's movement would also produce compression effects.

BRIEF DESCRIPTION OF DRAWINGS

Further features, advantages and details of the invention are to be described with reference to preferred embodiments illustrated in the accompanying drawings, in which:

FIG. 19 is a sectional view of a shuttle assembly in the fifth embodiment; and

FIGS. 20A and 20B illustrate the structure of a reed valve.

DETAILED DESCRIPTION OF PREFERRED EMBODIMENTS

In this application, the invention is described as a compressor for the sake of easy understanding. It should be understood that the same concept could be used for gas as well as for liquid, and also for a vacuum pump. Therefore, the term "compressor" should be interpreted as covering all these applications, unless specifically stated otherwise. Also, the same concept can be used to build a linear motor by simply removing valves and seal members. For this reason, there is no need for a separate description on how to change each compressor embodiment into a linear motor. Furthermore, the term "magnetic arrangement" used in this application should be interpreted to cover any arrangement for generating magnetic flux, including electromagnet, permanent magnet or a combination of both. There is no need to mention that replacing one type of "magnetic arrangement" by the other or combining the both types together would be obvious once the working principles are explained.

Finally it is also obvious that an efficient motor design can also be used as an electric generator by operating it in a reversed manner, i.e. by using a mechanical input to drive the motor which in turn produces an electric output.

General Structure of the First Embodiment

Figure 1A:
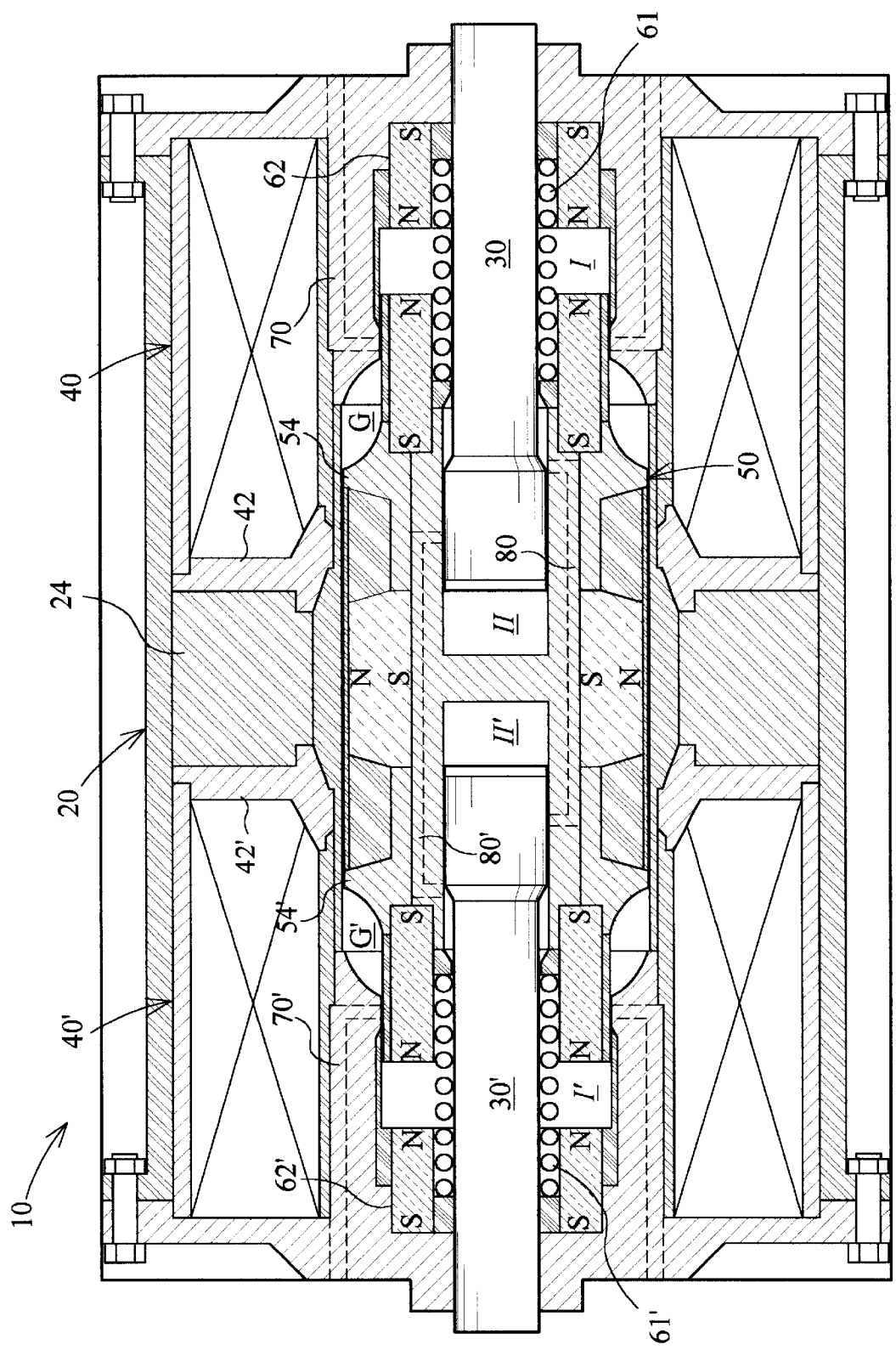
FIGS. 1A and 1B are cross-sectional views taken along the central axis of a compressor according to a first preferred embodiment of the present invention.

In FIG. 1A, a compressor 10 has a housing 20, two annular electromagnets 40 and 40' secured to the two ends of the housing, two short shafts 30 and 30' (not in section), each fitted in the centre of one electromagnet, a shuttle member 50 carried by the short shafts, and a suspension mechanism including helical springs 61 and 61' and cushioning magnets 62 and 62'. The two electromagnets 40 and 40' are arranged in a similar way as in my UK patent no. GB-2299715-B for generating a push-and-pull force onto the shuttle 50.

The compressor 10 is a double-acting unit with an internal multi-stage compression arrangement, which includes three pairs of separated chambers formed between the shuttle 50 and the electromagnets 40 and 40'. Specifically, two first-stage compressing chambers I and I' are the annular spaces between each axial end of the shuttle 50 and a cushioning magnet 62 or 62', into which the process fluid is supplied from outside the compressor via channels 70 and 70'. Two second-stage compressing chambers are formed by the cylindrical spaces II and II' inside the shuttle 50, into which the process fluid is supplied from the chambers I and I' via channels 80 and 80'. Two further chambers G and G' are the annular spaces around the shuttle pole pieces 54 and 54', forming gas springs as part of the shuttle's suspension mechanism.

Figure 2:
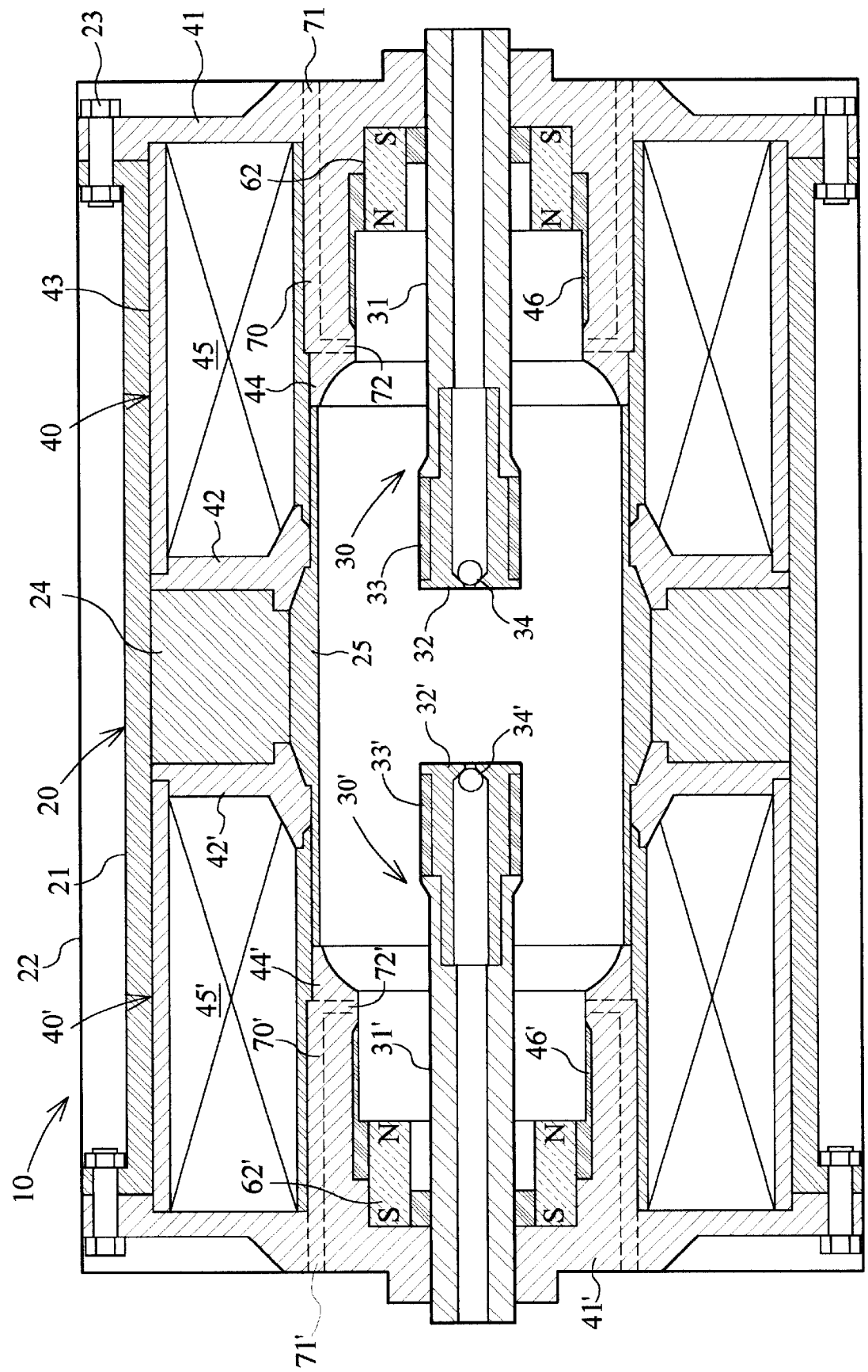
FIG. 2 is a sectional view showing static parts of the first embodiment.

In FIG. 2, the housing 20 has a non-magnetic cylindrical wall 21 with a number of outer fins 22 for better mechanical strength and thermal dissipation. The two electromagnets are identical, therefore only the right one 40 is described here. The corresponding parts of the left electromagnet 40' are indicated by the same reference numbers with an apostrophe'.

The electromagnet 40 has a magnetic base member 41 secured by fastening means 23 to the housing 20. Its magnetic circuit is formed by an annular outer pole piece 42, which is connected to the base 41 via a magnetic member 43, and a coaxial inner pole piece 44, directly connected to the base at its rear end. A toroidal coil 45 is fitted in the annular space defined by the members 42, 43, 41 and 44. An axially exposed magnetic gap is formed between the pole pieces 42 and 44 for interacting with the shuttle's pole piece, as to be described later.

Clamped between the two electromagnets is a separation ring 24 made of a non-magnetic and thermally conductive material, such as brass or aluminium, to improve the compressor's heat dissipation. A non-magnetic lining member 25 is fitted inside the ring 24, extending into the magnetic gaps of the two electromagnets. That is to say, the lining member 25 provides a complete and smooth inner surface for closely matching the outer surface of the shuttle 50, so that when the clearance between them is at the level of about 10 $\mu$m, it would form a clearance seal preventing gas leakage through them. The two end portions of the lining member 25 also define the outer wall of the gas spring chambers G and G'. The inner pole piece 44 has on its inner surface a lining member 46 forming the outer wall of the pre-compressing chamber I.

The two shafts 30 and 30' are axially aligned to guide the shuttle's movements. They are identical so only one, i.e. the right one 30, is described here. The shaft 30 has a tubular portion 31, a piston head 32 fitted to one end of the portion 31, a oneway valve 34 in the piston head and a seal 33 on the outer surface of the piston head. The seal 33 is made of a self-lubricating material, such as Teflon, for lubricant-free operation.

Shuttle Structure

Figure 3:
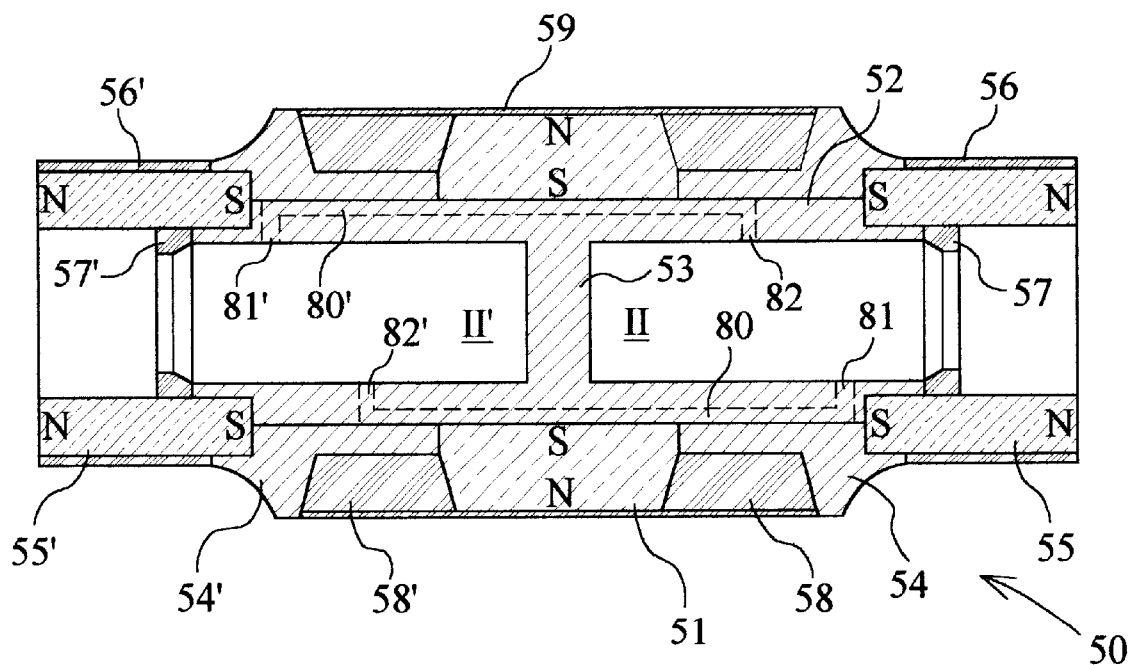
FIG. 3 is a sectional view of a shuttle in the first embodiment.

In FIG. 3, the shuttle 50 has an annular shaped middle magnet 51 magnetised in radial direction, e.g. its outer periphery is the North (the outer pole) and the inner periphery the South (the inner pole) so that its outer surface produces radial magnetic flux evenly distributed over its whole circumference for acting with the annular poles of the electromagnets. A magnetic tubular member 52 is fitted inside the annular magnet 51, serving as its inner pole piece.

Two intermediate pole pieces 54 and 54' are each fitted to one end of the tube 52, and at their axial ends are two end magnets 55 and 55', which are magnetised in axial direction. The polarity of the magnets is arranged in a way that the pole piece 54 or 54' is magnetically connected to the south pole of the middle magnet 51 and that of the end magnet 55 or 55', therefore it provides highly concentrated magnetic flux for acting with the electromagnet 40 or 40'. The annular space between the pole piece 54 or 54' and the magnet 51 forms an axially exposed magnetic gap for interacting with the electromagnet, which gas is filled with a non-magnetic and light-weight filling stuff 58 or 58', such as foamed plastics or resin, and covered by a non-magnetic low-friction sleeve 59 to form a smooth bearing surface. The two end magnets 55 and 55' are also covered by non-magnetic low-friction sleeve members 56 and 56'.

The interior of the tube 52 is divided by a separation member 53 into the two second-stage compressing chambers II and II'. The inner surface of the tube 52 forms gas-tight fit with the piston seals 33 and 33' of the two short shafts 30 and 30' shown in FIG. 2. A number of fluid communication channels 80 and 80' are formed between the outer surface of the tube 52 and the inner surfaces of the pole pieces 54, 54' and the middle magnet 51, so that the fluid in the first-stage compressing chamber I or I' can flow into an end magnet 55 or 55' then into the inlet hole 81 or 81' of the channel 80 or 80' and come out of the outlet hole 82 or 82' in the second-stage compressing chamber II' or II. Since there are a number of channels 80 and 80' evenly cut around the periphery of the tube 52 (only one of each is shown), the outlet holes 82 or 82' have gas bearing effects on the piston seal 33 or 33'.

Within each end magnet 55 or 55', there is a non-magnetic bushing 57 or 57' sitting against each end of the tube 52 for supporting the suspension spring 61 or 61' shown in FIG. 1A, and also magnetically separating the tube from the spring. When assembled, a small gap is formed between the bushing 57 and the shaft 30, allowing the fluid in the chamber I to enter the inlet holes 81 of the channels 80.

Reciprocating Operation

Now return to FIGS. 1A and 1B. In FIG. 1A, the shuttle 50 is at a neutral position, e.g. when there is no current in the two electromagnets the shuttle position is decided by the biasing forces of the two suspension springs 61 and 61'. At this position each of the shuttle's pole pieces 54 and 54' is interposed between the inner and outer pole pieces of the corresponding electromagnet, i.e. in its axially exposed magnetic gap. Similarly, each of the electromagnet's inner pole piece 42 or 42' is interposed between the middle magnet and one of the pole piece 54 or 54', i.e. in the shuttle's axially exposed magnetic gap. In this application, the term "axially exposed magnetic gap" is used to describe a magnetic gap structure in which the two pole pieces defining a gap are positioned to have an axial distance so that the magnetic flux over the gap would be generally in axial direction. Since both the electromagnets and the shuttle have axially exposed magnetic gaps, their respective pole pieces can be positioned in a mutually interposed relationship. Such a mutually interposed relationship allows the shuttle a relatively long stroke without weakening the effective magnetic linkage between the shuttle and the electromagnets, therefore making the operation highly efficient.

Figure 1B:
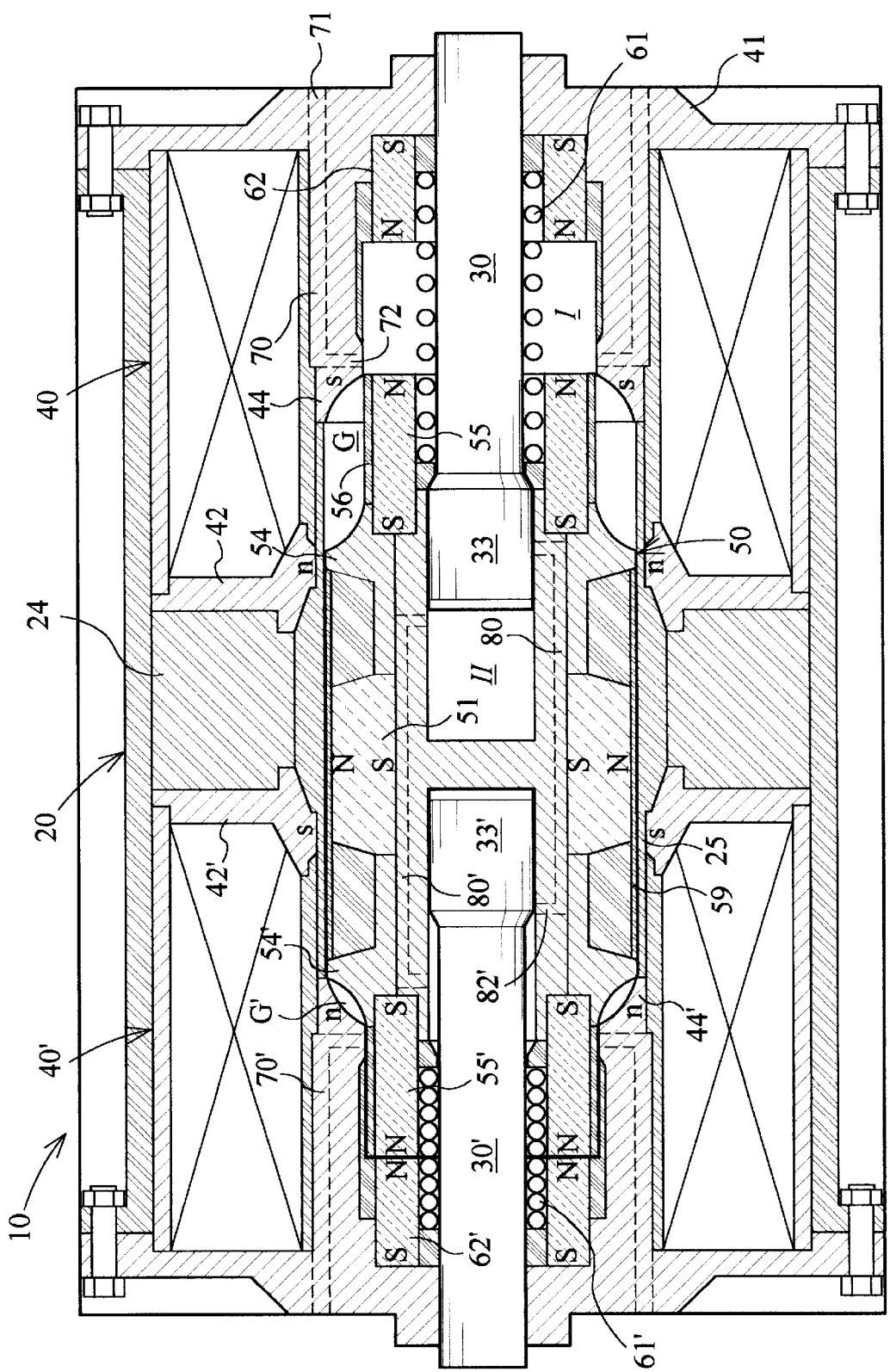

In FIG. 1B, the electromagnets are energised and the polarity of their pole pieces is marked by low case letters n and s, showing the interaction between the electromagnets and the shuttle. The shuttle is driven by the magnetic forces to the left. More particularly, the electromagnet 40 is at a status that its outer pole piece 42 is n and the inner one 44 is s, so its effect is to push the shuttle's middle magnet 51 away and to pull the end magnet 55 into the gap. On the other hand, the electromagnet 40' is at a status to push the other end magnet 55' away and to pull the middle magnet 51 towards the gap. That is to say, the end magnet 55 forms a closed magnetic circuit with the electromagnet 40 and the middle magnet 51 with the electromagnet 40'. When the current passing through the two electromagnets is reversed, the shuttle will be driven to the other end in a similar way. Because each electromagnet would always act with at least one of the shuttle magnets, its energy efficiency is high.

In FIG. 1B, as the end magnet 55' approaches the cushioning magnet 62', a strong repelling force is generated between them. This strong cushioning force together with the effects of the suspension spring 61', which is compressed close to its solid length, and the gas spring formed by the chamber G', which is reduced to a small "dead" space, provide adequate protection to prevent the shuffle from hitting the pole piece 44'. The three elements of the suspension mechanism, i.e. the cushion magnets, which act with the shuttle's end magnets as magnet springs, mechanical springs and gas springs, are selected to make the shuttle's natural frequency close to that of the power supply, e.g. 50 Hz or 60 Hz, so that the shuttle can operate at its resonant frequency.

During operation, the shuttle is precisely aligned by the piston heads and kept coaxial with the other parts of the compressor. Because the total contacting area between the shuttle and the piston heads is very small, friction and wear are also small. On the other hand, since the electromagnets' pole faces are generally annular or cylindrical in shape, matching that of the shuttle's, they produce no sideways driving forces during the shuttle's reciprocating movements. The only possible source of side force is the helical springs 61 and 61', but their sideways effects are restricted by the shafts 30 and 30'. All these elements ensure that the total friction resistance to the shuttle's movements is very small and the shuttle can operate lubricant-free.

Multi-stage Compression

The compressor 10 is a double-acting machine for its shuttle movements in two opposite directions produce the same compressing effects. When considering the path travelled by a process fluid, there are two gas communication/ compression routes, which are mutually separated. One starts from the right end at the gas inlet holes 71 on the base 41, goes into the pre-compressing chamber I via the channels 70, then as the shuttle moves back, the gas flows into the end magnet 55 and then via the channel 80 into the second-stage compressing chamber II', and finally at the next shuttle stroke the gas leaves the compressor through the short shaft 30' at the left end. The other route is formed in the same way in opposite direction. In each gas flow route, a first one-way valve is formed by the shuttle's sealing surface 56 which opens and closes the outlet holes 72 of the channels 70 and a second one-way valve is formed by the piston's sealing surface 33' which opens and closes the outlet holes 82' of the channels 80. That is to say, whether the channels 70 and 80 are opened or closed depends on the axial position of the shuttle 50.

In FIG. 1A, the shuttle is positioned to block all the channels 70, 70' 80 and 80' so there is no gas flow into the compressor or between the chambers inside the compressor. In FIG. 1B, the shuttle 50 moves to the left, the space in the right chamber I is expanded and the channels 70 is opened so gas is sucked in; at the same time the channels 80 is blocked and the space in the chamber II' is reduced to zero so the gas in it is forced out through the outlet valve 34' in the piston 32'. On the other hand, the same shuttle movement blocks the left channels 70' and the space in the chamber I' is reduced to minimum so the gas in it can only go via the channels 80' into the next stage chamber II which is expanded to suck the gas in. In next stroke when the shuttle moves to right the process reverses direction.

In addition to the advantage of achieving two-stage compression by a single moving part, the arrangement also has the advantage that each compressing operation has minimum leakage. For example, when the shuttle moves to the left, the left chambers I' and II' are both at their compressing phase so their internal pressure increases at the same time, and the leakage from the chamber II' into the chamber I' is reduced. Similarly, the pressure in the gas spring chamber G' is also high, which helps to reduce the leakage from the chamber I'. Further, although there is a very small gap between the shuttle's outer bearing surface 59 and the inner bearing surface of the lining member 25 for keeping them virtually non-contact, this gap forms a long leakage route compared with the shuttle's outer diameter so when the shuttle reciprocates at high speed any leakage through this long gap would be ignorable. All these features make the lubricant-free operation practical because the shuttle does not rely on lubricant for sealing. Finally, it is worth mentioning that because the gas inlet holes into each chamber are arranged peripherally around the corresponding bearing surfaces, they also produce gas bearing effects which help to reduce friction and wear.

General Structure of the Second Embodiment

Figure 4A:
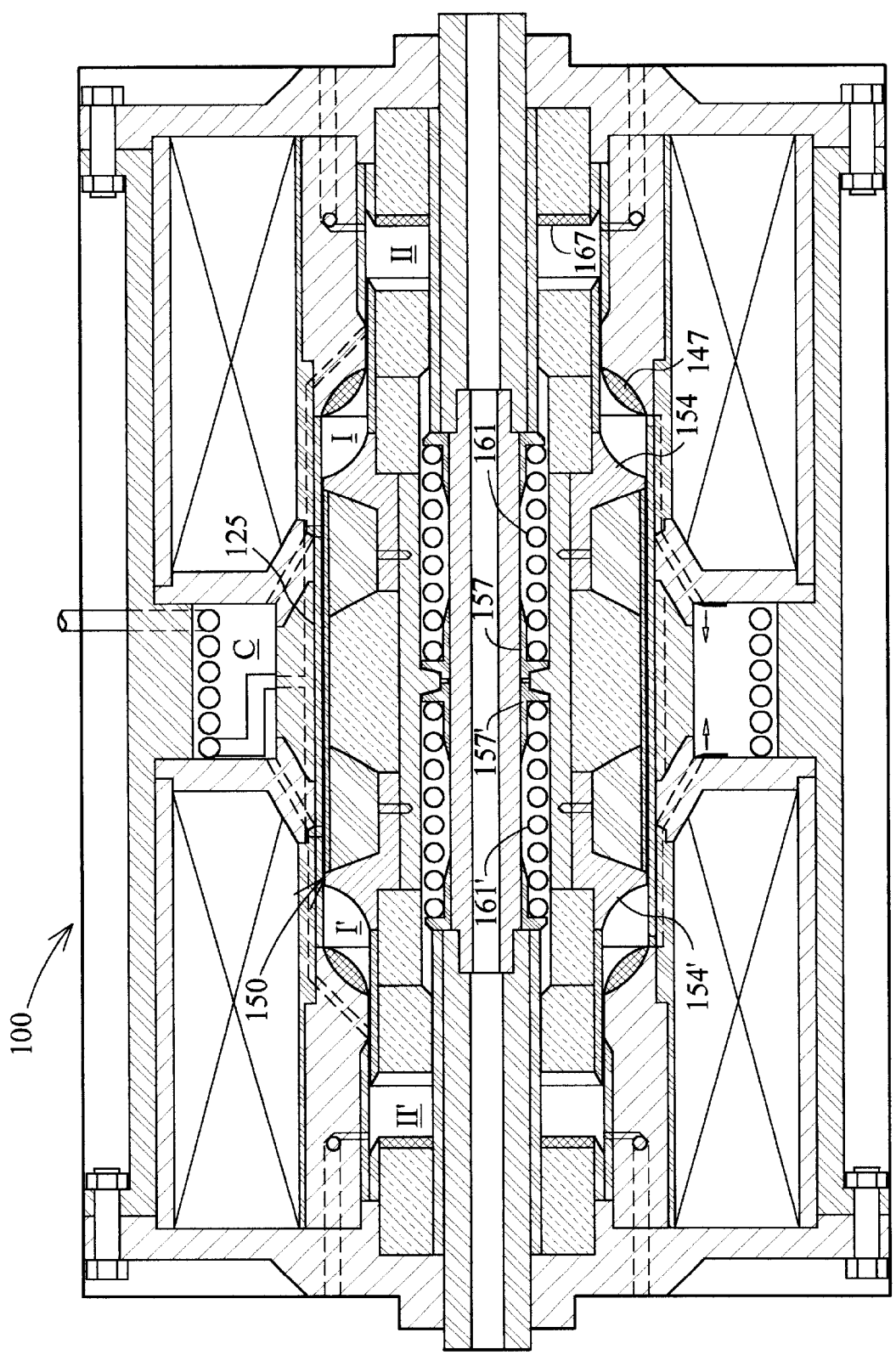
FIGS. 4A and 4B are sectional views taken along the central axis of a compressor according to a second preferred embodiment of the present invention.
Figure 4B:
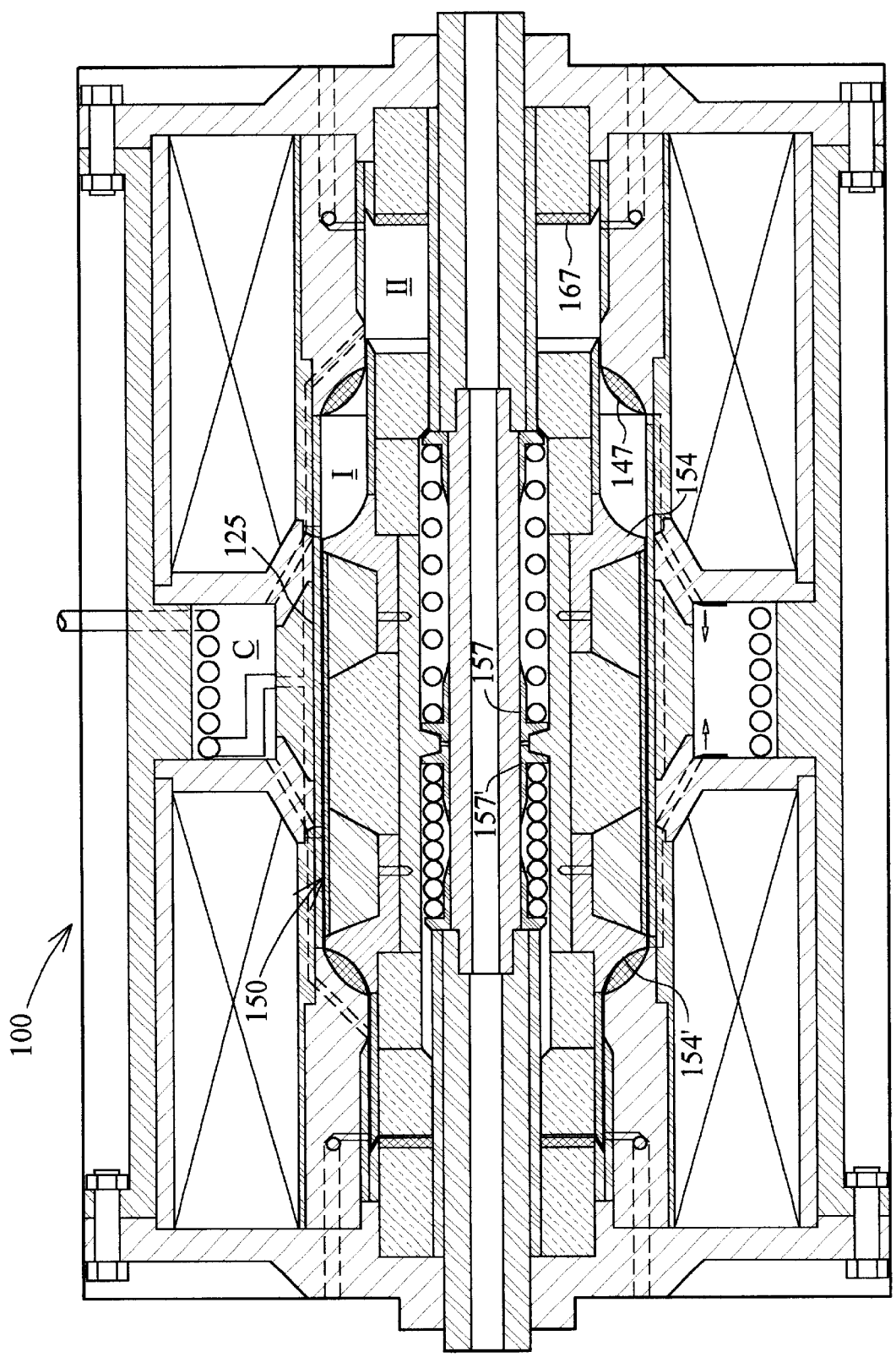

In FIGS. 4A and 4B, the general structure of a compressor 100 and its operation are similar to that of the first embodiment. The main differences are in its central guide structure, suspension mechanism, multi-stage compression and intercooling arrangement. Only these new features are described below.

Figure 5:
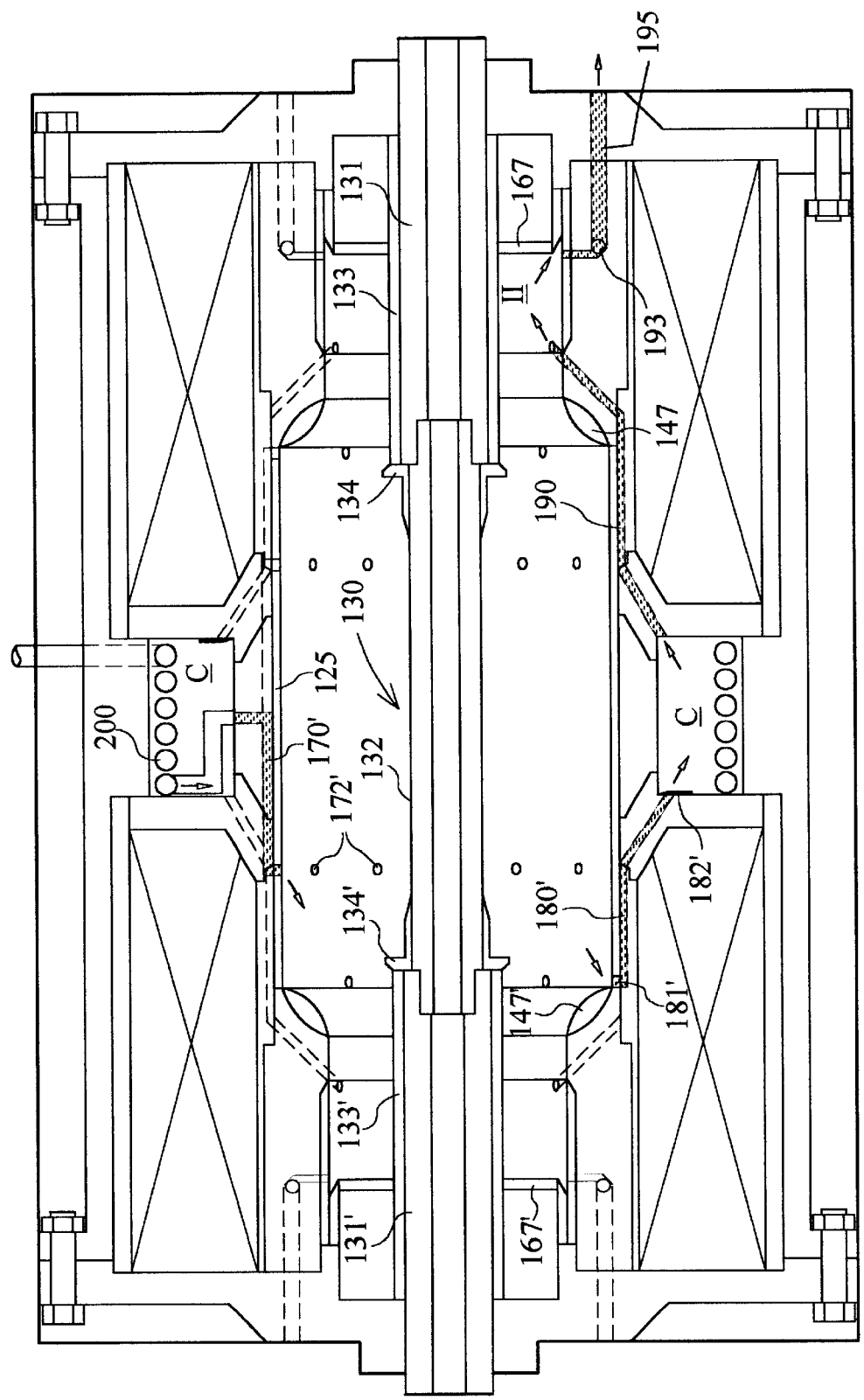
FIG. 5 is a sectional view showing static parts of the second embodiment.

In FIG. 5, a central guide 130 has two end sections 131 and 131', each secured to a base of an electromagnet, and a middle section 132 fitted between the end sections. Each end section is covered by a low-friction sleeve 133 or 133' which provides a sliding seal surface. Two bushings 134 and 134' are fitted at the two ends of the middle section 132 for supporting suspension springs. A through hole is formed along the axis of the central guide 130, which can be used to circulate a fluid to cool the compressor from within.

Figure 6:
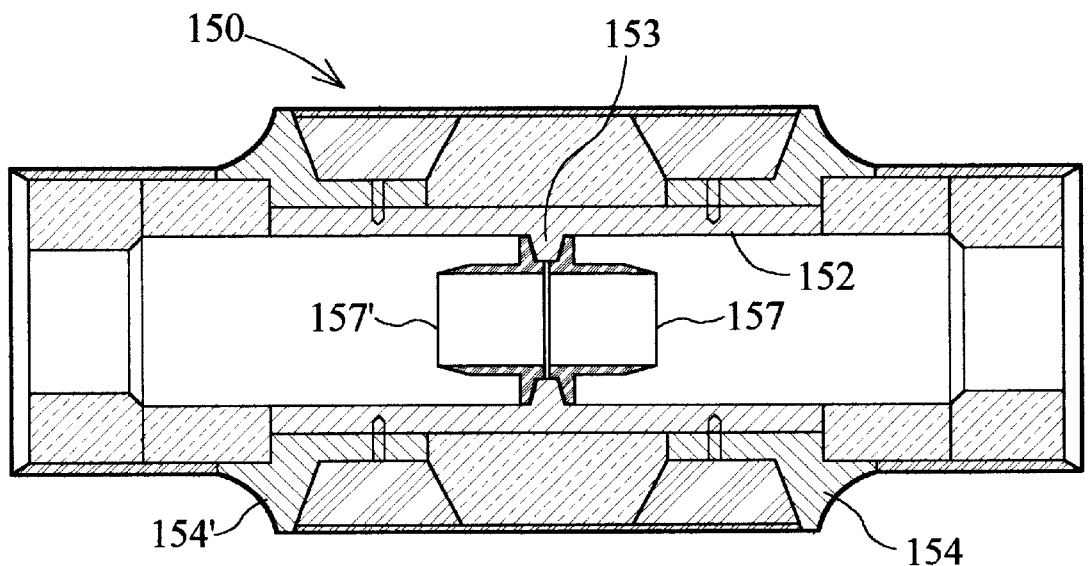
FIG. 6 is a sectional view of a shuttle in the second embodiment.

In FIG. 6, the shuttle 150 has an inner pole piece 152 with an internal ridge 153, which bears two seal rings 157 and 157'. The seals also serve as bushings for suspension springs. The shuttle's other parts, i.e. its middle magnet, two end magnets and two intermediate pole pieces 154 and 154' are similar to that of the first embodiment.

As shown in FIG. 4A, when the shuttle 150 is assembled in the compressor 100, its two end magnets have sliding fit on the two end sections of the central guide and the two seals 157 and 157' have sliding fit on the middle section of the central guide, which ensure the shuttle is precisely coaxial with the other parts during operation. The seals also divide the shuttle's internal space into two gas-tight chambers, in each of which is fitted a suspension spring 161 or 161' so that in operation the shuttle is suspended by the effects of both the helical springs and the gas springs.

The annular space between each of the shuttle's pole piece 154 or 154' and the inner pole piece of a corresponding electromagnet forms a first-stage compressing chamber I or I'. Two second-stage compressing chambers are formed by the annular spaces II and II' between the shuttle's end magnets and their corresponding cushioning magnets. In the first-stage compressing chambers I and I' there are elastomeric rings 147 fitted on the pole face of the inner pole piece, which ring is to cushion the shuttle from hitting the pole piece directly and at the same time avoid any dead space in the compressing chamber. There are similar rings 167 and 167' in the second-stage chambers II and II'. An intercooling chamber C is formed between the two electromagnets, which chamber has gas communication passages for receiving compressed gas from the two first-stage compressing chambers I and I' and for supplying the gas to the two second-stage compressing chambers II and II'. All these passages are formed around the periphery of the lining member 125.

The gas communication routes in the compressor 100 are described in detail with reference to FIG. 5, in which the hatching patterns of different parts are deleted and the gas passages to be described are shaded so as to make the illustration easy to read. A gas inlet line passes through the housing wall to enter the chamber C and form a coil 200. The coil helps heat exchange between the gas in the inlet tube and that outside it to produce cooling effects in the chamber C.

In operation, the gas in the tube 200 is supplied via channels 170', which have outlet holes 172' in the first-stage compressing chamber I', into that chamber. Then the same gas is forced by the shuttle movement out of the chamber through channels 180' and into the chamber C via the one-way valves 182', so the pressure in the chamber C builds up. At the same time, the high pressure gas in the chamber C enters channels 190 which have outlet holes in the second-stage chamber II at the other end. When the shuttle reverses its movement, the gas in the chamber II is forced out via the outlet valves 193 in channels 195. Another parallel gas flow route is arranged in the same way in opposite direction.

It should be noted that the intercooling chamber C receives compressed gas from both first-stage chambers I and I', and supplies the same gas to both second-stage chambers II and II', so the operating conditions at both sides are the same. This helps to stabilise the shuttle's double acting operation in opposite directions. In such an arrangement, although there is only one moving part inside the compressor, it achieves high output pressure and flow rate in a very efficient manner.

General Structure of the Third Embodiment

Now the third embodiment of this invention is described with reference to a compressor 300 shown in FIGS. 7 to 9. Many aspects of the compressor 300 and its basic working principles are similar to that of the earlier embodiments. New features include a three-coil motor stator, a different shuttle structure, a revised central guide arrangement, an improved magnet spring arrangement and different multi-stage compression and intercooling arrangements. The new features are described below in details.

Figure 7:
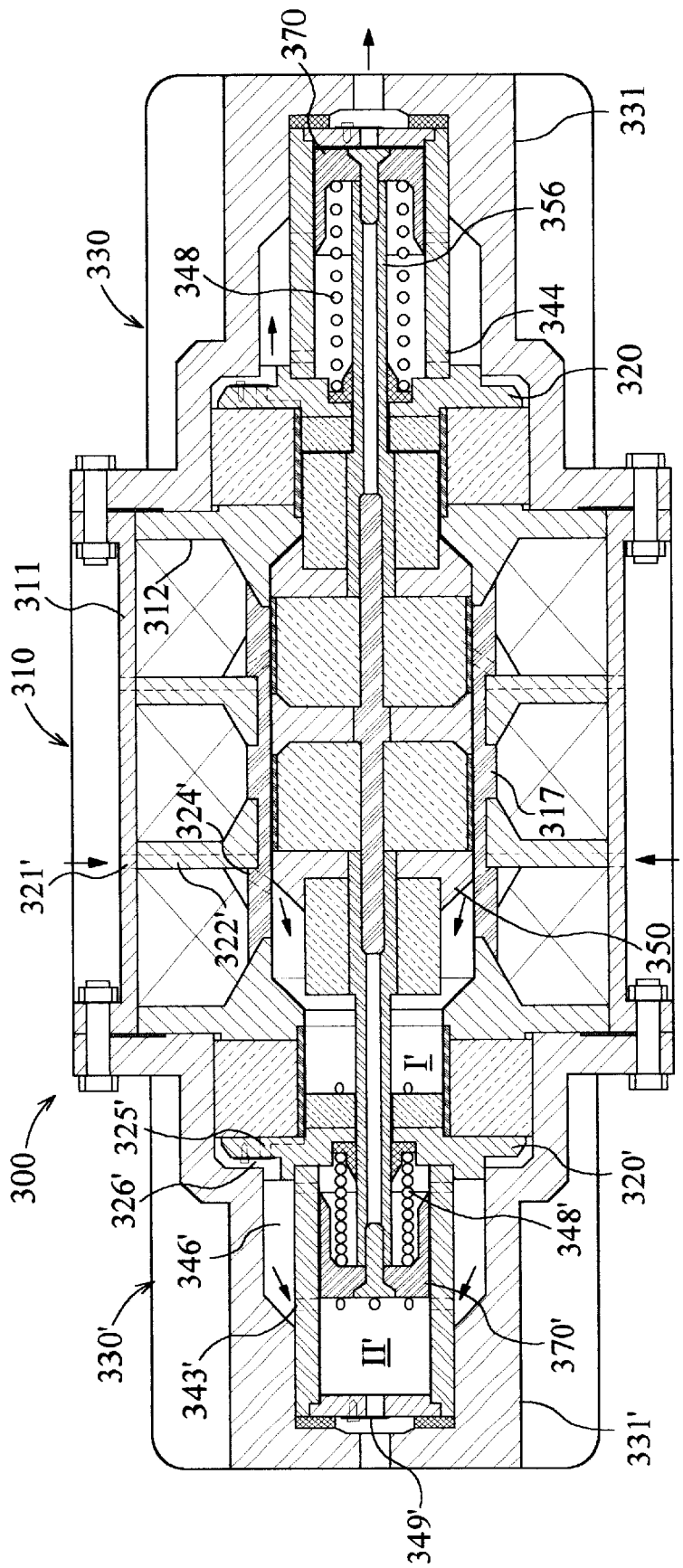
FIG. 7 is a sectional view taken along the central axis of a compressor according to a third preferred embodiment of the present invention.

As shown in FIG. 7, the compressor 300 includes a linear motor formed by a stator 310 and a magnetic shuttle 350, and a pair of second stage compression assemblies 330 and 330', each fitted to one end of the stator. Inside each compression assembly 330 or 330', a piston 370 or 370' is connected to and driven by the shuttle 350. In operation, a process gas first enters first stage compression chambers inside the stator, then it flows into intercooling chambers located outside the stator to release some of the heat before entering and being further compressed in second stage compression chambers in the assemblies 330 and 330', which are located away for the motor so that heat generated by second stage compression can be easily dissipated. Details of the static parts of the stator 310 and the assemblies 330 and 330' are shown in FIG. 8 while that of the shuttle member 350 and its connection with the two pistons 370 and 370' in FIG. 9.

Figure 8:
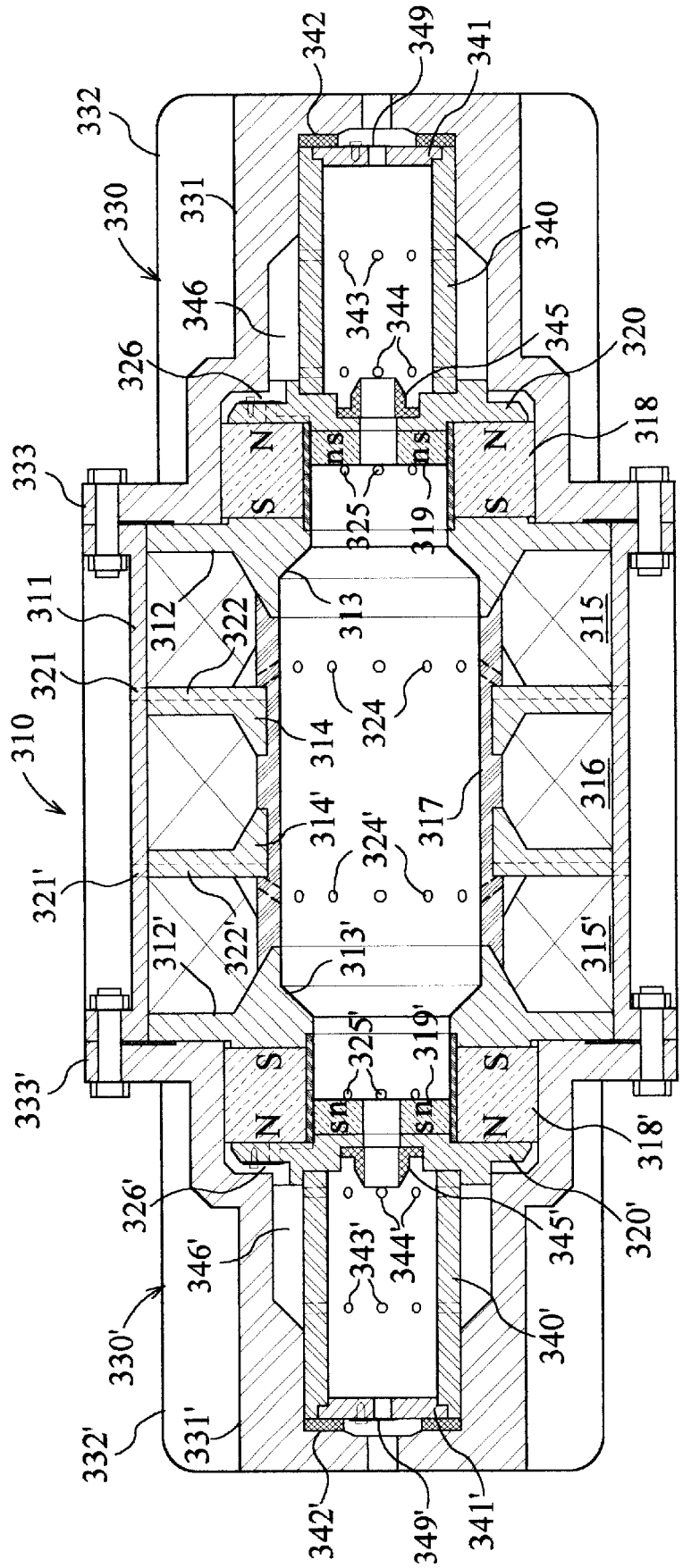
FIG. 8 is a sectional view showing static parts of the third embodiment.

In FIG. 8, the stator 310 has a housing 311 made of magnetic material serving as part of the stator magnetic circuit. The housing 311 can have a number of outer fins to increase its mechanical strength and to improve heat dissipation. A mechanically strong housing also helps to keep all the other static parts precisely aligned, as to be further described below. At each end of the housing 311 is fitted a base member 312 or 312' which carries an inner pole pieces 313 or 313'. Three winding coils 315, 316 and 315' are axially arranged inside the housing 311 and separated from one another by two annular pole pieces 314 and 314'. A non-magnetic cylinder 317 is fitted inside the winding coils and clamped between the two inner pole pieces 313 and 313', defining a cylindrical inner space for accommodating the shuttle 350. A number of throughholes 324 and 324' are formed on the cylinder wall as gas inlet to the chambers I and I'. In this arrangement, the four pole pieces 313, 314, 314' and 313' form between them three axially exposed annular magnetic gaps, each corresponds to a coil so that when the coils are energised strong alternating flux would be generated across the gaps to drive the shuttle's reciprocation movements. By having a third coil in the motor structure, total driving force on the shuttle is increased without changing motor diameter and volume. Corresponding changes are made in magnetic arrangement in the shuttle, as to be described below.

At the back side of each inner pole piece 313 or 313', there is arranged a magnet spring assembly including inner magnet 319 or 319', back pole piece 320 or 320' and outer magnet 318 or 318'. As shown by the polarity of the magnets in FIG. 8, a high flux concentration is formed from the exposed face of the magnet 319 or 319' to the inner edge of the pole piece 313 or 313' which is basically the space of the compression chamber I or I'. In this arrangement, because the inner pole face of the magnet spring is "nested" inside the outer magnet, most of the magnetic flux is "trapped" inside spring structure which makes the spring more effective and powerful. Further, since the outer magnet 318 or 318' has a much larger volume compared with the inner magnet 319 or 319', it allows the use of low cost material, such as ferrite, in the spring assembly. Ferrite has the extra advantages of generating no eddy currents and also has a higher maximum working temperature.

Each of the second stage compression assembly 330 or 330' is fitted against an associated base member 312 or 312', enclosing a magnet spring arrangement. Since the two assemblies are identical in structure, only the one at the right-hand side, i.e. the assembly 330 is to be described in detail. The assembly 330 has a generally cup-shaped casing 331 with external fins 332 made of a non-magnetic and thermally conductive material, such as aluminium. The left-hand side of the casing 331 has a flange 333 which matches the shape of the housing 311 so that the two of them can be precisely aligned and secured together. Inside the casing 331 is a second stage cylinder member 340 with one end sitting against the pole piece 320 and the other end fitting into the casing 331, closed by a cylinder head member 341. The cylinder 340 and the head member 341 define a second stage compression chamber II, which has gas inlet holes 343 through the cylinder wall and a gas outlet hole in the middle of the head member 341, which is covered by an outlet valve 349. A seal 342 ensures gas-tight fit between the cylinder 340 and the casing 331. Another seal 345 is fitted on the pole piece 320 to seal a piston shaft, which seal also supports a suspension spring as to be described later. Between the cylinder 340 and the casing 331, there is an annular space 346 which receives compressed gas from the first stage compression via the outlet valve 326 on the pole piece 320 and works as an intercooling chamber.

Figure 9:
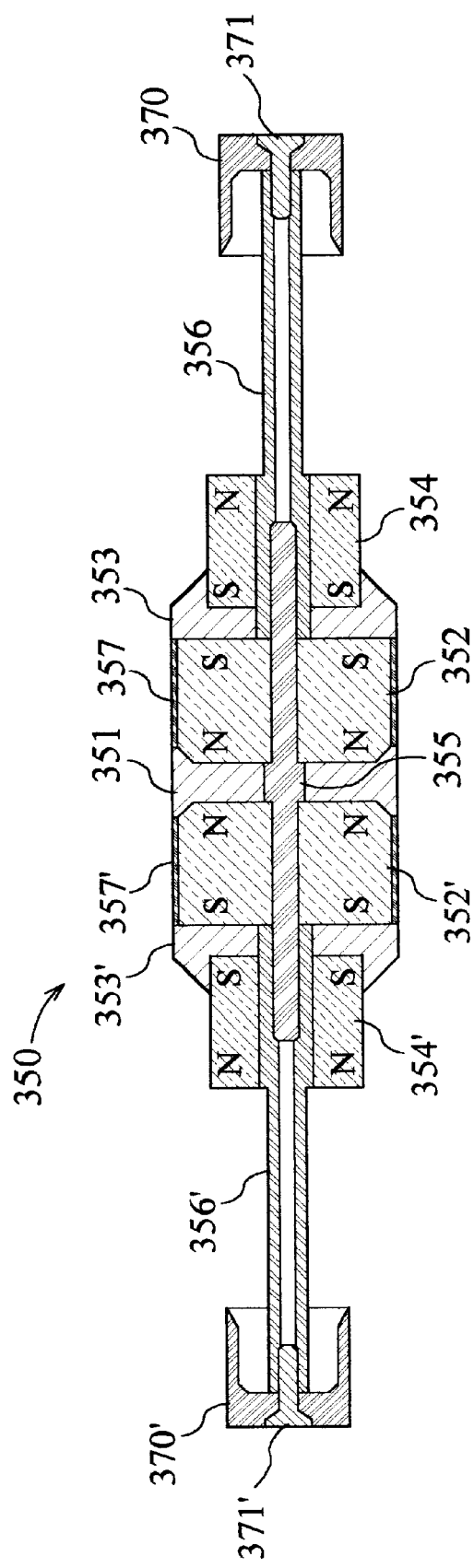
FIG. 9 is a sectional view of a shuttle assembly in the third embodiment.

In FIG. 9, the shuttle 350 has a middle pole ring 351, two middle magnets 352 and 352', two intermediate pole pieces 353 and 353' and two end magnets 354 and 354', all fitted on a central pin 355 made of non-magnetic material, which keeps the magnets and pole pieces coaxial. All the magnets carried by the shuttle 350 are magnetised in axial direction, so each of them forms an axially exposed magnetic gap along its length. Again, due to the relatively large volume of the middle magnets 352 and 352', it is possible to use low cost material, such as ferrite, to build the shuttle without sacrificing its magnetic strength. The polarity of the magnets 352, 352', 354 and 354' are arranged in a way that the two middle magnets 352 and 352' have the same pole towards the common pole piece 351 so as to generate concentrated magnetic radial flux. The outer surface of the middle magnet 352 or 352' is covered by a seal member 356 or 356' to form a sliding seal working with the inner surface of the cylinder 317 in FIG. 8. At each end of the central pin 355 is fitted a shaft 356 or 356', which serves as a central guide to extend through the stator's base member and keep the shuttle coaxial with the stator. Each shaft also carries at the other end a piston 370 or 370' fastened by a screw 371 or 371' for performing second stage compression.

Now back to FIG. 7, the shuttle is supported by the pole pieces 320 and 320', which are precisely aligned by the two casings 331 and 331', and all the other static members are aligned to ensure that the shuttle 350 and the two pistons 370 and 370' can have virtually non-contact reciprocating movement in operation. When the shuttle 350 is fitted into the central space inside the stator 310, it divides the space into two first stage compression chambers I and I'. Similarly, the piston 370 or 370' divides the central space in each of the second stage cylinder 340 or 340' into a second stage compression chamber II or II' and a spring chamber for accommodating a suspension spring 348 or 348', which chamber is in fluid communication with the intercooling chamber 346 or 346' via the holes 344 or 344'. Since the spring chambers are always in fluid communication with the intercooling chambers, they work as part of the total intercooling space.

The gas flow routes in the compressor 300 are shown by the arrow signs in FIG. 7. When the shuttle 350 moves to the right-hand end, the volume of the first stage compression chamber I' expands and gas is sucked in through a gas flow passage formed by the inlet holes 321' on the stator housing 311, the channels 322' on the inner pole piece and holes 324' through the cylinder 317. At the same time, the chamber II' sucks in gas from the intercooling chamber 346' via the holes 343'. When the shuttle reverses its movement, it will block the holes 324' so the gas in the chamber I' will be compressed and forced through the channel 325' and the outlet valve 326' into the intercooling chamber 346', while the gas in the chamber II' will be compressed and forced out through the outlet valve 349'.

By allowing cold gas to enter the compressor 300 through the middle part of the stator it produces good cooling effects to the coils and the shuttle. On the other hand, the compressed gas coming out of the chamber I or I' is temporarily stored in the intercooling chamber 346 or 346' where it is cooled before entering the chamber II or II', making the whole process more efficient. Further, because the chambers II and II' are further away from the stator and shuttle, the heat generated by second stage compression would not affect the motor operation, avoiding motor overheating.

Figure 10:
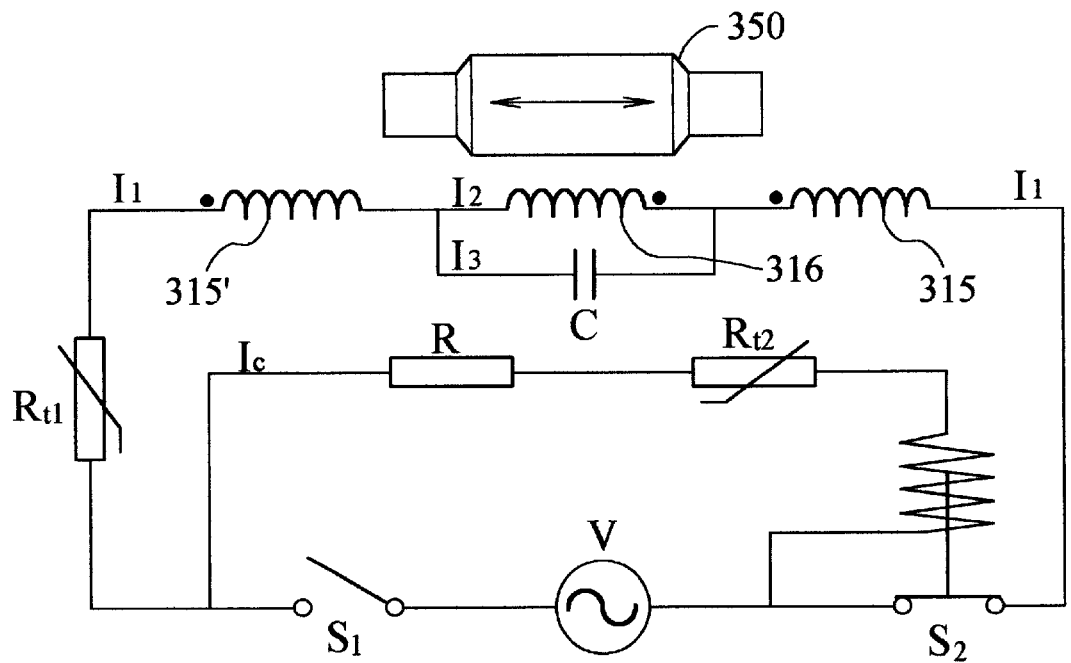
FIG. 10 shows a control circuit for the third embodiment.

FIG. 10 shows a control circuit for the compressor 300. An important concept shown in this circuit is that a phase difference is produced between the winding coils 315' and 315 as one group and the winding coil 316 as another group e.g. by connecting a capacitor C in parallel with the coil 316. The current $I_1$ through the coils 315' and 315 is the phasor sum of the current $I_2$ through the coil 316 and the current $I_3$ through the capacitor C, i.e.

$$I_1 = I_2 + I_3.$$

Because the current through the capacitor C, i.e. the current $I_3$, leads the current $I_2$ through the coil 316, which is basically an inductive member, it makes the current $I_1$ also leads the current $I_2$. That is to say, since the same current $I_1$ passes through the coils 315' and 315, the magnetic driving forces by these two coils are always in phase with each other but leading the driving force produced by the coil 316 by a phase difference decided by the value of the capacitor C. In operation, as the shuttle 350 is approaching an axial end position under the joint driving forces by the three coils, the two end coils 315' and 315 reverse their current direction before the middle coil 316, therefore producing an effective suspension effect which would enhance the effects by the suspension spring arrangement. Because this effect only happens when the shuttle is close to its end positions, it will not damage the system efficiency; instead it improves the overall efficiency by making the shuttle movement better suspended. By selecting a suitable value for the capacitor C, the system can be easily fine-turned to suit a particular application. The circuit also includes a protection thermistor $R_{t1}$ to prevent current surge at start-up and an overheating protection circuit including a resistor R, a thermistor $R_{t2}$ and a relay switch $S_2$. The operation of the protection circuit is conventional so no further description is needed.

General Structure of the Fourth Embodiment

Now the fourth embodiment of this invention is described with reference to a compressor 500 shown in FIGS. 11 to 15. Many aspects of the compressor 500 and its working principles are similar to that of the earlier embodiments. New features include electromagnet pole pieces with flux switching arrangement and pole face extension patterns, an electric circuit arrangement for generating phase differences in the driving coils and a revised suspension arrangement. The new features are described below in details.

Figure 11:
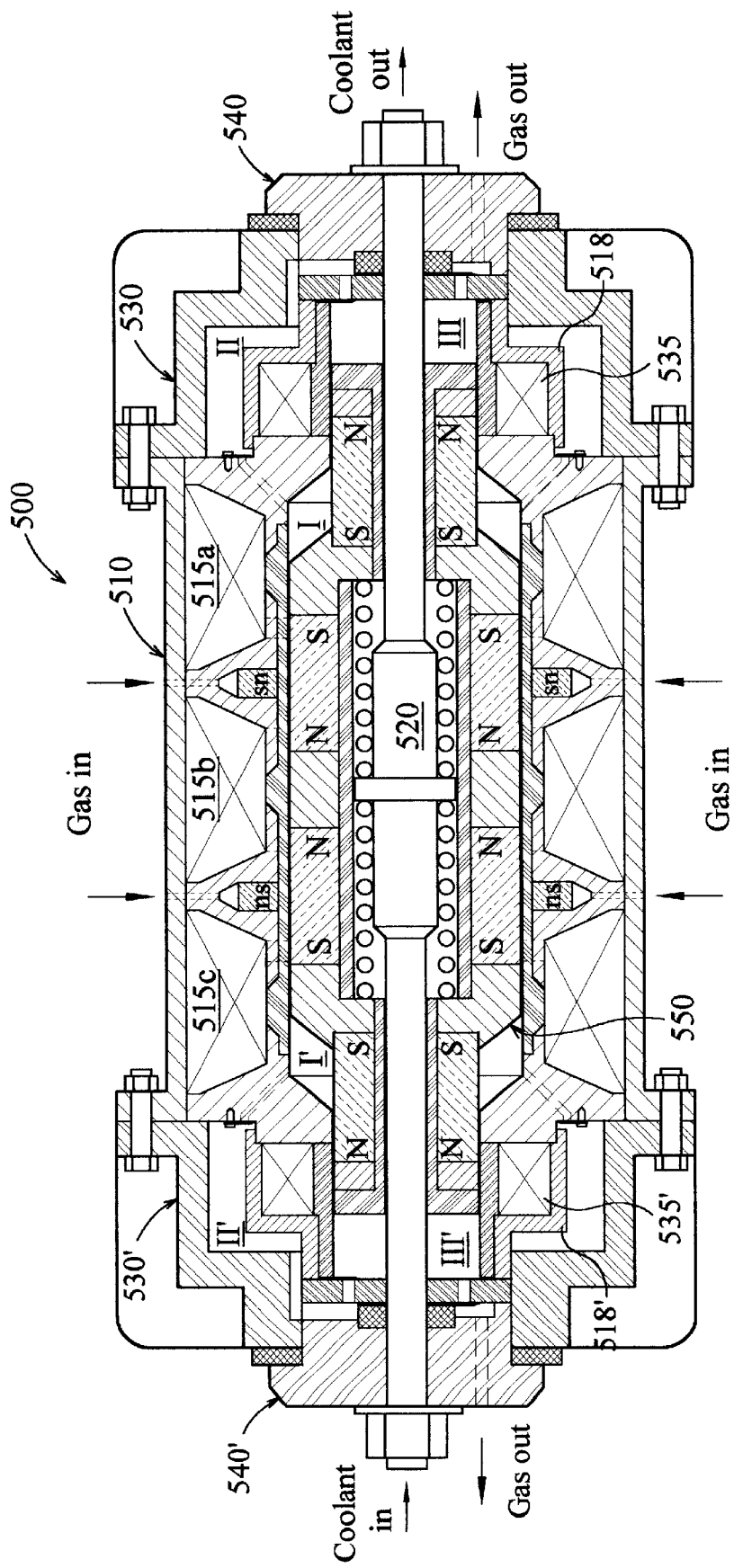
FIG. 11 is a sectional view taken along the central axis of a compressor according to a fourth preferred embodiment of the present invention.

In FIG. 11, the compressor 500 includes a stator 510, a shuttle 550, a pair of end assemblies 530 and 530' and a central guide 520 which secures the whole unit together. In operation, process gas would enter chambers I and I' through the stator, then forced by the shuttle into intercooling chambers II and II' inside the end assemblies 530 and 530' and then enter chambers III and III' to be further compressed and finally forced out through outlet valves in valve blocks 540 and 540'.

Figure 12:
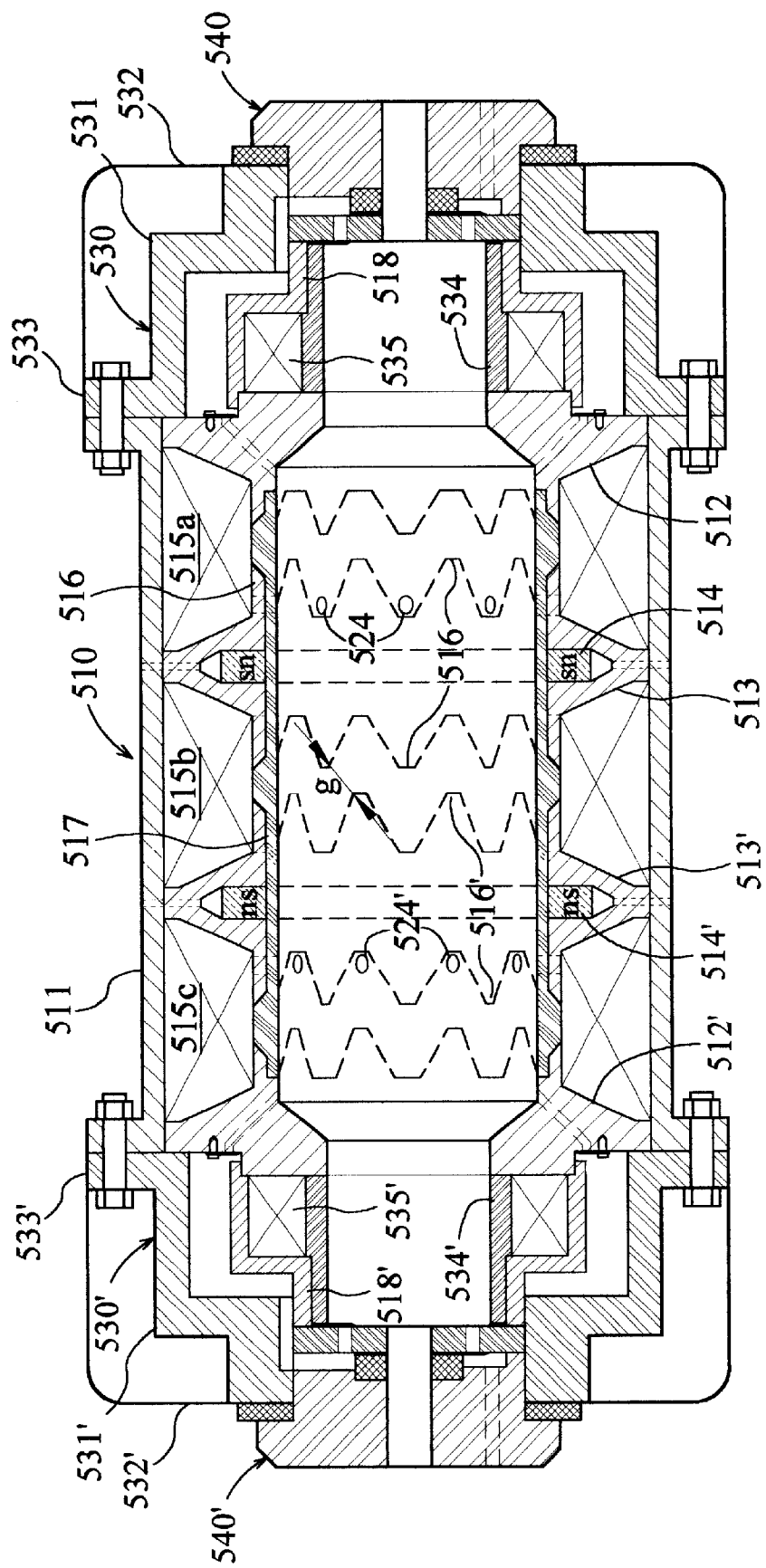
FIG. 12 is a sectional view showing static parts of the fourth embodiment.

In FIG. 12, the central guide 520 and the shuttle 550 have been removed to show the details of the stator 510 and the two end assemblies 530 and 530'. The stator 510 has housing 511 of magnetic material serving as part of the stator magnetic circuit. At each end of the housing 511 is fitted an end pole piece 512 or 512'. Three winding coils 515a, 515b and 515c are coaxially arranged inside the housing 511 and separated from one another by two annular pole pieces 513 and 513' which have annular pole face with toothed pole face extension pattern 516 and 516'. The toothed pattern ensures that the magnetic linkage between the shuttle and the stator is improved, especially when the current reverses its direction, by extending the stator's pole face in axial direction, while at the same time avoids excessive flux leakage over the gap by keeping a necessary gap length g between the tooth tips as shown by the arrow sign in FIG. 12. The pole pieces also have flux switch arrangement formed by magnets 514 and 514', their working principles are to be further described with reference to FIGS. 14A to 14E.

A non-magnetic cylinder 517 is fitted inside the three coils and clamped between the two end pole pieces 512 and 512', defining a cylindrical inner space for the shuttle 550. Gas inlet holes 524 and 524' are formed on the cylinder 517 in a similar way as in the previous embodiment.

The assembly 530 has a non-magnetic casing 531 with external fins 532 of thermally conductive material, such as aluminium. The casing 331 has a flange 533 which matches corresponding flange of the stator housing 511 to ensure precise alignment between them. Inside the casing 531 is a second stage cylinder 534 with one end sitting against the end pole piece 512 and the other end against the valve block 540. Surrounding the cylinder 534, there is a magnet spring formed by a winding coil 535 and a pole piece 518. Between the magnet spring and the casing 531, there is an intercooling chamber II with relevant inlet and outlet valve arrangements.

Figure 13:
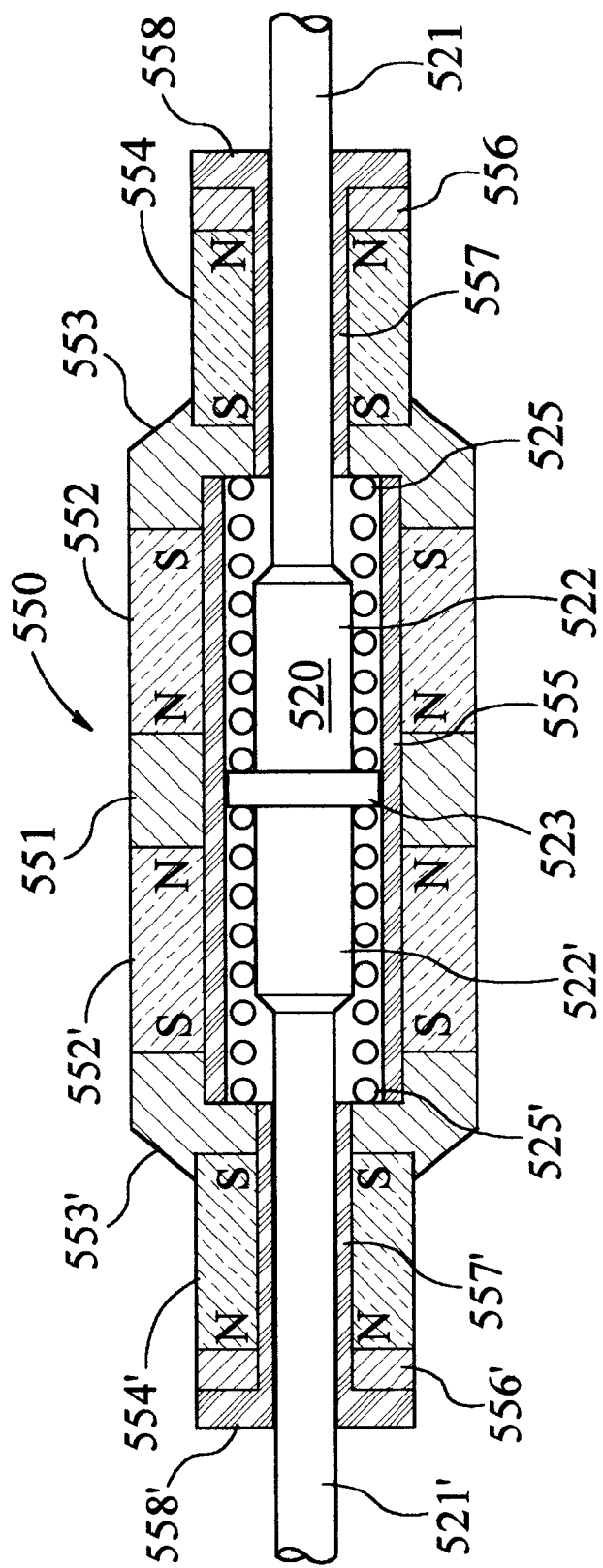
FIG. 13 is a sectional view of a shuttle assembly in the fourth embodiment.

In FIG. 13, the shuttle 550 has a middle pole ring 551 and two middle magnets 552 and 552' fitted on a central tubular member 555 made of non-magnetic material. To each end of the tubular member 555 is fitted an intermediate pole piece 553 or 553', which holds an end magnets 554 or 554' and an end pole piece 556 or 556'. The magnet 554 or 554' and its end pole piece 556 or 556' are fitted on a bearing member 557 or 557' made of plastic or composite bearing material which has an annular end part forming a piston face 558 or 558'. In operation, the piston face 558 or 558' also provides thermal insulation to prevent the magnets becoming overheated. Again, all these magnets are magnetised in axial direction, so each of them forms an axially exposed magnetic gap along its length between the corresponding pole pieces. That is to say, the shuttle 550 has four magnetic gaps to interact with the three gaps formed in the stator. As to be further described below, at any particular moment of operation, there would always be three magnetic gaps on the shuttle interacting with the stator while the other one interacts with a magnetic spring.

The shuttle 550 is supported by an internal suspension mechanism formed by a central shaft 520 and a pair of mechanical springs 525 and 525'. The central shaft 520 has a thicker middle portion 522 with a middle flange 523 supporting the springs. At each end of the middle portion 522 is a thin shaft portion 521 or 521' extending through the bearing member 557 or 557'. As shown in FIG. 11, the other end of the thin shaft portion 521 or 521' extends through the valve block 540 or 540' and the whole unit is precisely aligned and secured by bolts. The shaft 520 is hollow so that a coolant can be circulated through to keep the whole unit, especially the shuttle 550, cooled during operation.

Figure 14A:
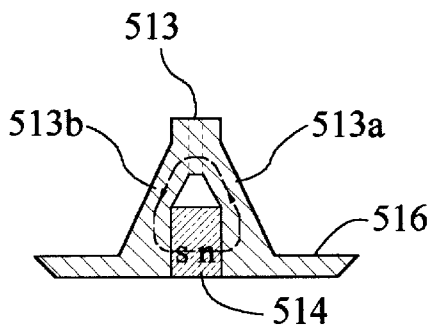
FIGS. 14A to 14E illustrate working principles of a flux switching mechanism.
Figure 14B:
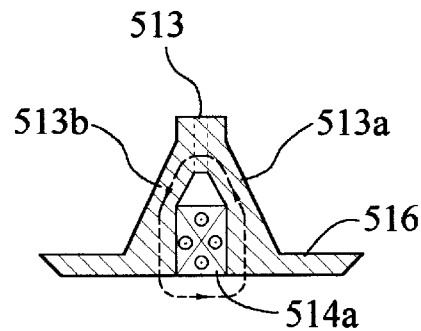

FIGS. 14A to 14E show the working principles of the flux switching mechanism used in the fourth embodiment. In FIG. 14A, when the magnet 514 is fitted into an annular recess formed in the pole piece 513, the flux generated by the magnet 514 forms a closed circuit through the narrow parts 513a and 513b to bring the flux in these parts close to flux saturation. FIG. 14B shows a similar flux distribution generated by a winding coil 514a. Since these two alternatives work in similar ways, only the one using permanent magnet 514 is to be described below.

Figure 14C:
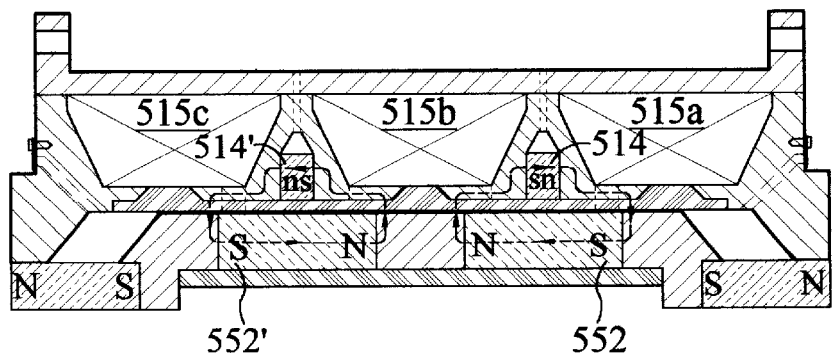
Figure 14D:
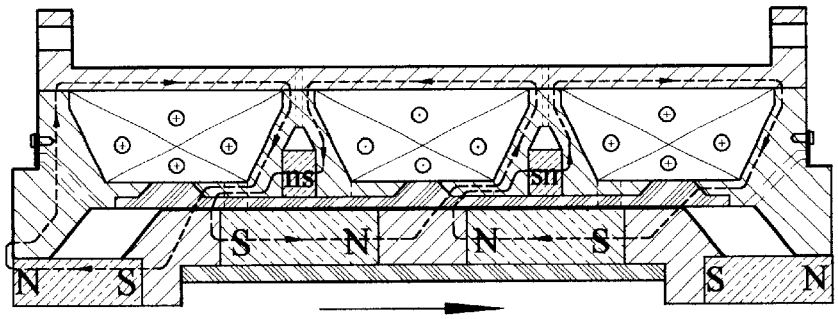
Figure 14E:
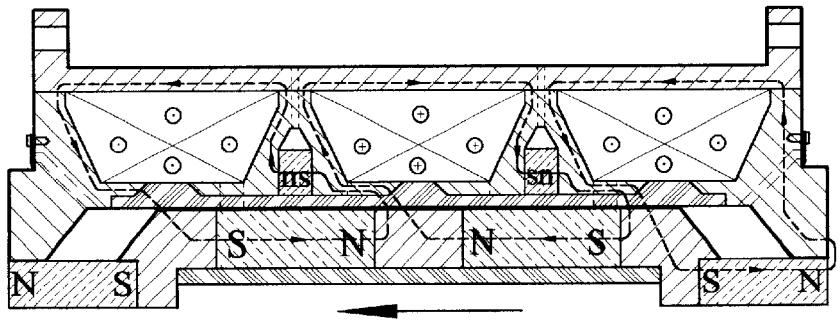

FIG. 14C shows the flux distribution when a shuttle is fitted inside a stator with no current in any of the three coils. The flux generated by the switching magnets 514 and 514' and that by the middle magnets 552 and 552' interact with each other to form two closed magnetic circuits, which produce strong registration forces to lock the shuttle to its neutral position where the magnetic resistance in each circuit would be the minimum. When the stator is energised, as shown in FIG. 14D, the flux generated by the magnets 514 and 552 would be linked with that of the coil 515a, so are the magnets 514' and 552' with the coil 515b, producing a combined driving force towards the right-hand side, as shown by the large arrow sign to bottom of the drawing. It should be noted here that most of the flux through each of the pole pieces 513 or 513' is switched to the left-hand side half of the extended pole face patterns, leaving no significant flux at the other side. When the current reverses direction, as shown in FIG. 14E, the flux would be switched by the switching magnets 514 and 514' to the other side of the pole pieces 513 and 513', driving the shuttle towards the opposite direction. By switching the flux from one half of the pole piece to the other half in response to the change of the current direction, the magnetic linkage between the stator and the shuttle is significantly improved, which allows the shuttle a relatively long stroke under high energy efficiency.

Figure 15:
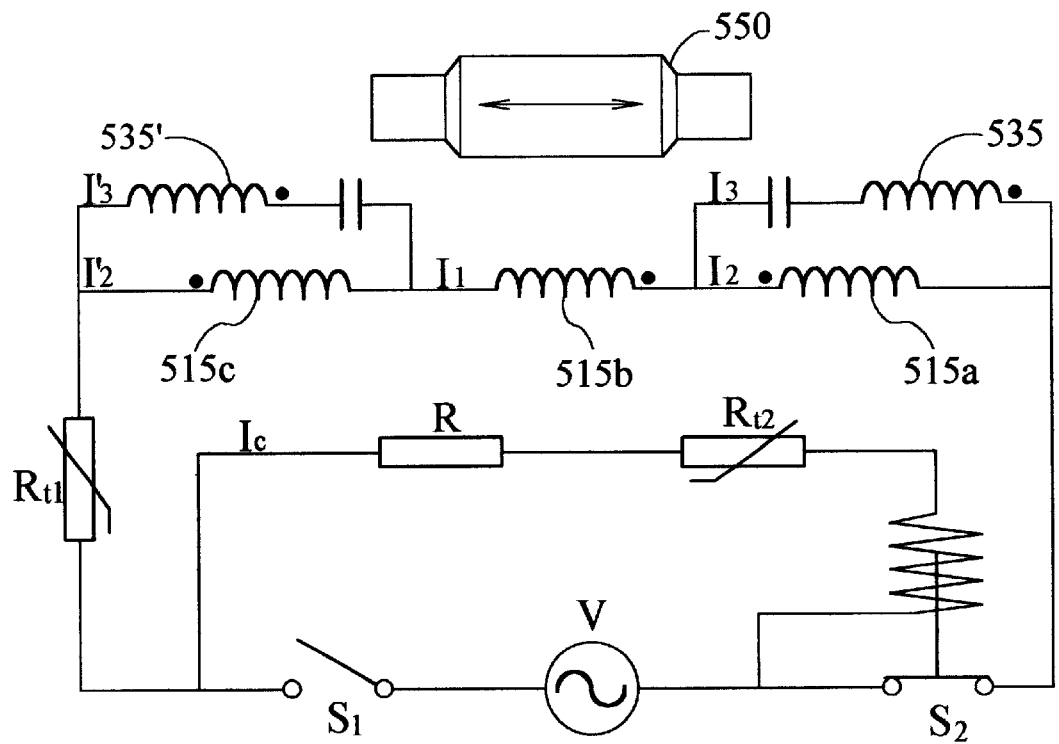
FIG. 15 is a control circuit for the fourth embodiment of the present invention.

FIG. 15 shows a control circuit for the fourth embodiment. In this circuit, each magnetic spring coil 535 or 535' is connected to a capacitor in series, then the two of them is connected with the coil 515a or 515c in parallel, which in turn is connected to the coil 515b in series. Again, the current $I_1$ through the coil 515b is the phasor sum of the current $I_2$ through the coil 515a and the current $I_3$ through the coil 535, or the phasor sum of the current $I'_2$ through the coil 515c and the current $I'_3$ through the coil 535', i.e.

$$I_1 = I_2 + I_3 = I'_2 + I'_3.$$

In this way, the five coils are divided into three groups having different phase differences, with the coils 535 and 535' leading the coil 515b which in turn leads the coils 515a and 515c. In operation, as the shuttle 550 approaches an end position, the magnetic spring coil 535 or 535' would have already reversed its current direction to produce a repelling force, which is helped by the coil 515b in the middle to force the shuttle to move backwards. Again the system can be fine-turned by selecting suitable value for the magnetic spring coils 535 and 535' and their associated capacitors.

General Structure of the Fifth Embodiment

Now the fifth embodiment of this invention is described with reference to a compressor 600 shown in FIGS. 16A to 20B. Many aspects of the compressor 600 and its working principles are similar to that of the earlier embodiments. New features include: a more compact shuttle assembly design with central guide extending through its whole length for precise alignment of its parts, a suspended stator design to ensure the machine's vibration-free operation which also has a cylinder extending through its whole length for its precise alignment; a novel gas flow passage and check valves fitted inside the shuttle's central guide. The new features are described below in details.

Figure 16A:
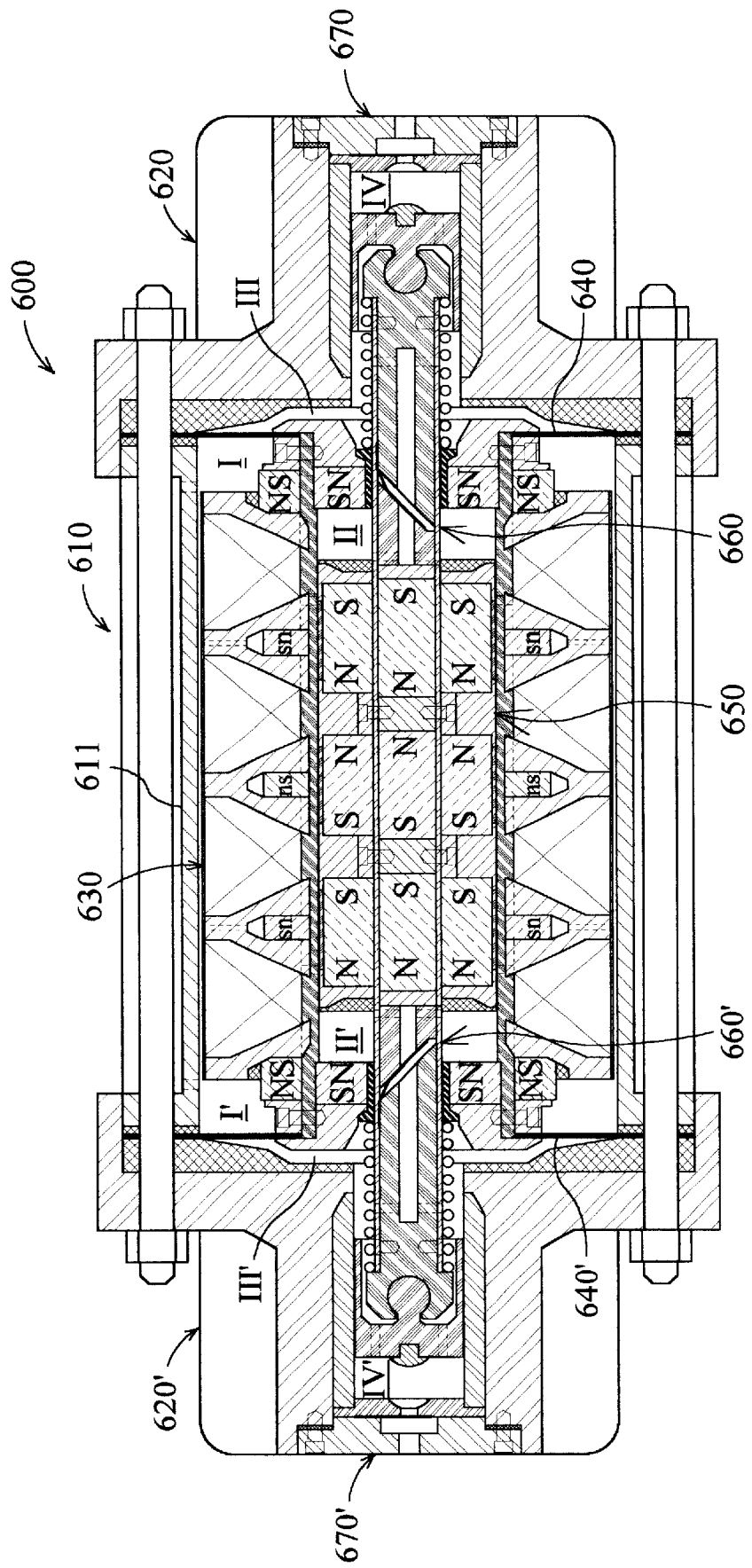
FIGS. 16A and 16B are sectional views taken along the central axis of a compressor according to a fifth preferred embodiment of the present invention.
Figure 16B:
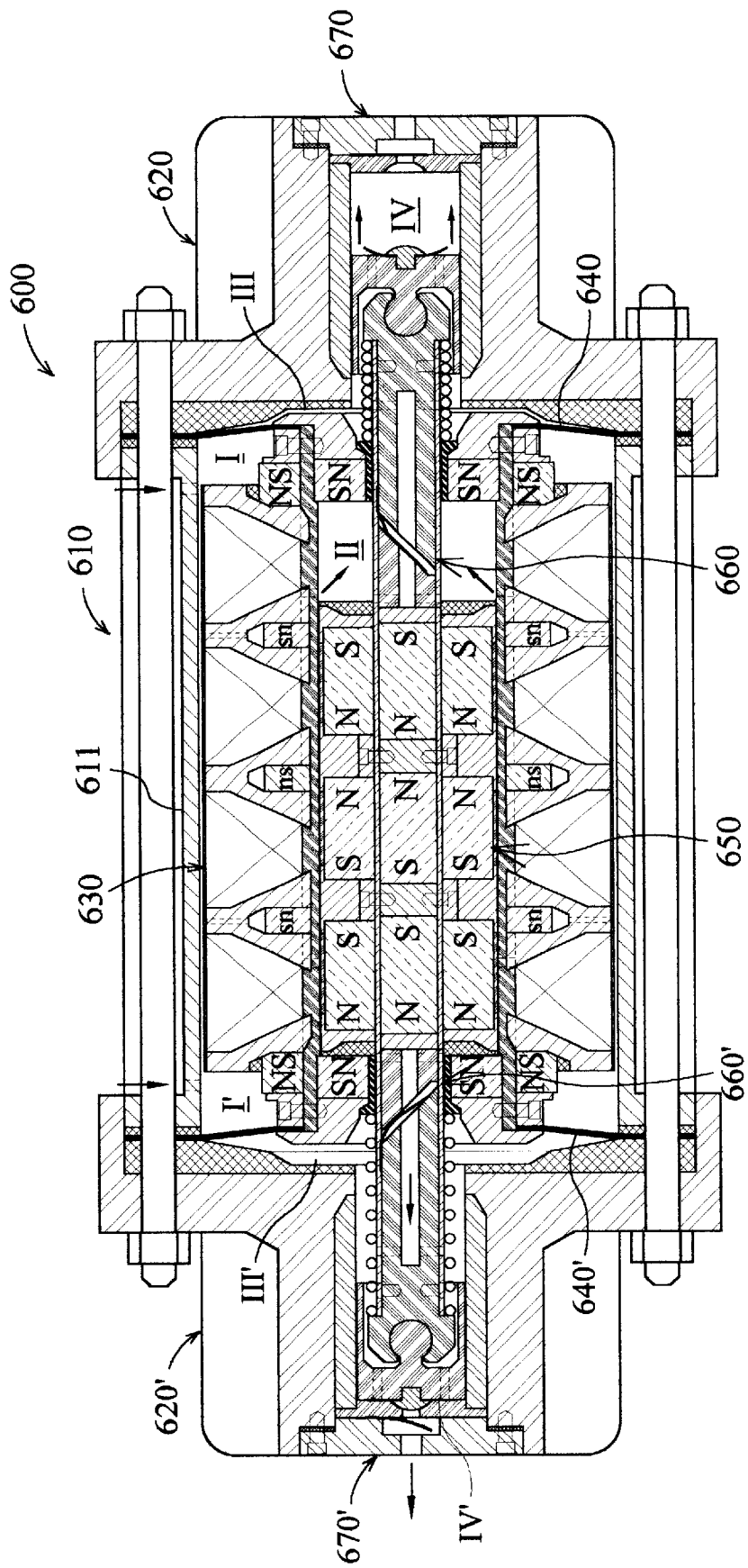

In FIGS. 16A and 16B, the compressor 600 includes a housing 610 formed by a tubular member 611 and two end assemblies 620 and 620', a stator 630 suspended by a pair of disk springs 640 and 640' and a shuttle assembly 650 fitted inside the stator with its two ends extending into each of the end assemblies 620 and 620'.

Figure 17:
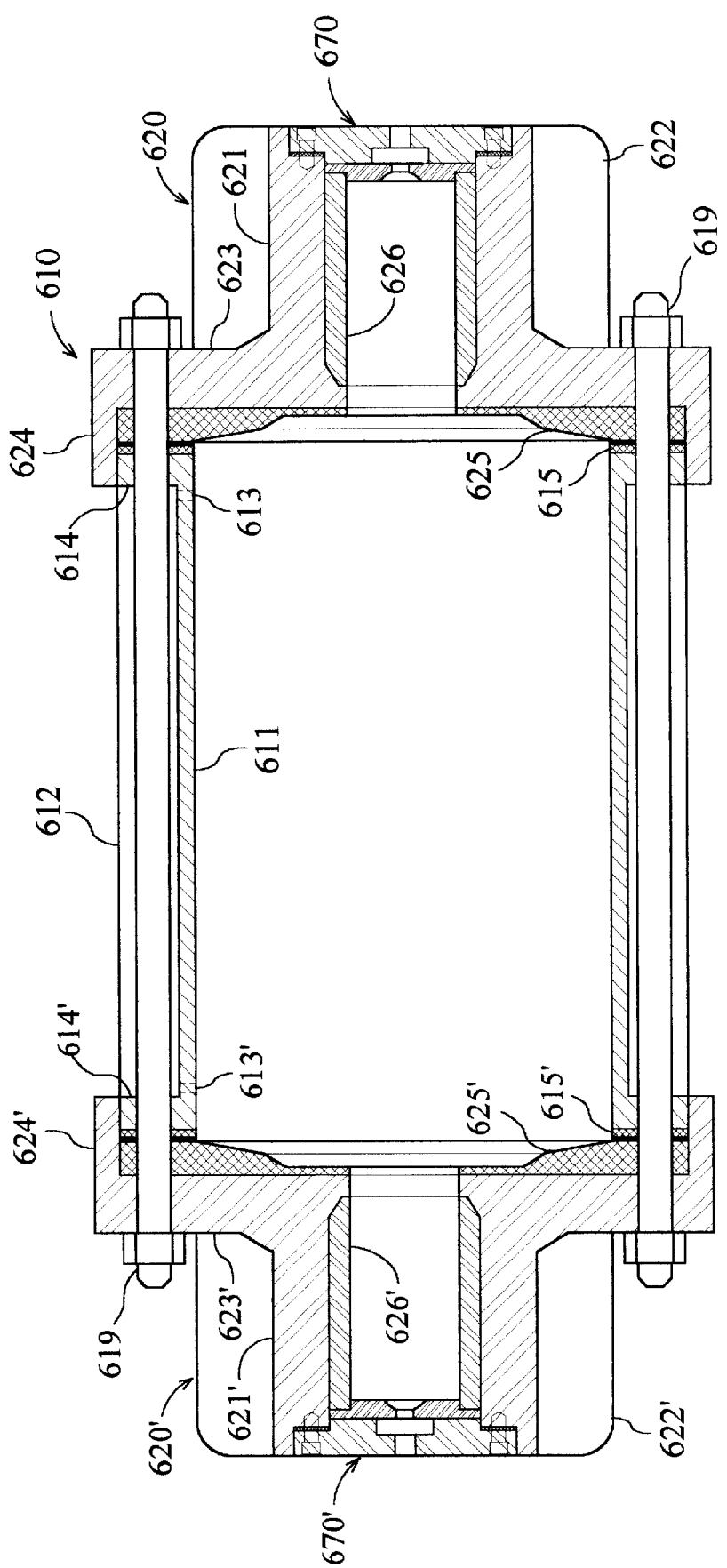
FIG. 17 is a sectional view of a housing structure of the fifth embodiment.

In FIG. 17, the stator and the shuttle assembly have been removed to show the details of the housing 610. The middle section of the housing is formed by the tubular member 611 and the two ends are the end assemblies 620 and 620' secured to the middle section by fastening means 619. The tubular member 611 has outer fins 612 to improve its mechanical strength and heat dissipation. The whole member is made of magnetic material so that it also serves as part of the stator's magnetic circuit. Throughholes 613 and 613' form gas inlet into the housing. At each end of the member 611 is a flange 614 or 614' for precise alignment and fastening with the end assemblies 620 and 602'. The two end assemblies 620 and 620' are identical so only the assembly 620 is described here. The assembly 620 has a non-magnetic and thermally conductive body formed by e.g. aluminium casting. The casting has a cylindrical portion 621 with external fins 622 for heat dissipation and a flange portion 623 with an extended lip 624 for engaging the corresponding flange of the tubular member 611. An elastomer member 625 is fitted inside the lip 624 and covering the inner surface of the flange portion 623 so that when the machine is assembled a pair of disk springs 640 and 640' (not shown in FIG. 17) are clamped between the elastomeric member 625 and an elastomer bushing 615 to ensure a gas-tight fit. The elastomer member has a surface which is shaped to match the end portion of the stator so as to provide impact protection to the disk spring and stator and also to provide thermal and noise insulation, as to be described later. Inside the cylindrical portion 621 there is a cylinder liner 626 which, together with a valve block 670, defines a compression chamber.

Figure 18:
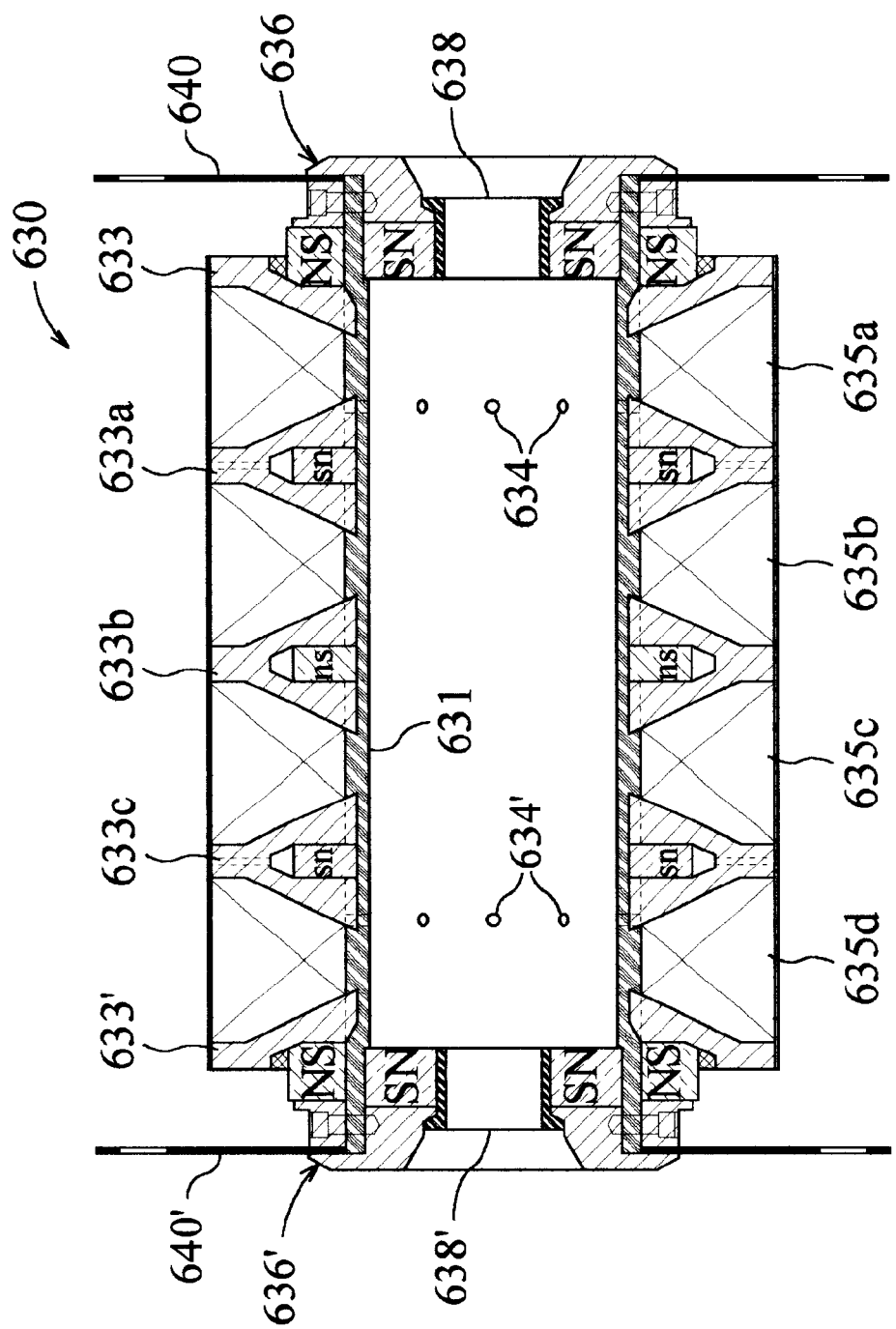
FIG. 18 is a sectional view of a stator in the fifth embodiment.

FIG. 18 shows the structure of the stator 630 and its suspension springs 640 and 640'. The stator has a non-magnetic cylinder 631 extending through its whole length, defining a cylindrical inner space for accommodating the middle portion of the shuttle assembly 650. The cylinder 631 can be made of a self-lubricating material, preferably a composite material with metal or glass fibre re-enforcement for its excellent mechanical strength and good thermal conductivity. Gas inlet channels and holes 634 and 634' are formed through the pole pieces and the cylinder 631 in a similar way as in the earlier embodiments. Surrounding the cylinder 631 are fitted four winding coils 635a, 635b, 635c and 635d, separated form one another by three intermediate pole pieces 633a, 633b and 633c and held together by two end pole pieces 633 and 633'. The intermediate pole pieces 633a, 633b and 633c have flux switching magnets as in the previous embodiment. Each end pole piece is fitted with a magnetic spring 636 or 636' which is secured to one end of the cylinder 631 and also provide attachment to the suspension spring 640 or 640'. Inside each magnetic spring 636 or 636' is fitted a slide bearing/seal member 638 or 638' for bearing the shuttle shaft. The disk springs 640 and 640' are formed by a lamination of thin metal sheet(s) and non-metal elastomer sheet(s), such as rubber or plastics, so the springs also serve as diaphragms dividing the space between the housing 610 and the stator 630 into separated gas-tight chambers, as to be described later. The springs' stiffness is selected to make the stator's nature frequency close to the frequency of the electric power input.

In FIG. 19, the shuttle assembly 650 has a non-magnetic central guide member in the form of a thin-walled tube 656 which carries all the other parts and keeps them precisely aligned. The tube 656 can be made of e.g. stainless steel or titanium. The shuttle's middle portion is formed by a series of magnets and pole pieces including a middle ring magnet 651, two middle pile pieces 652 and 652', two end ring magnets 653 and 653' and two end pole pieces 654 and 654', which carry elastomer bushing 655 and 655' for impact protection. The middle portion has a cylindrical outer surface covered by a self-lubricating film to form a clearance seal with the cylinder 631 in FIG. 18. Inside the tube 656, there are a number of rod magnets 651a, 653a and 653a' and pole pieces 652a, 652a40, 654a and 654a', which fill the space inside the tube and form a very compact design. Also fitted inside the tube 656 are two reed valves 660 and 660' which have inlet holes 657 and 657' and outlet holes 658 and 658' for one-way gas flow.

Each end of the tube 656 is fitted with a piston head 665 or 665', via a universal joint formed by a ball-shaped member 666 or 666' and a joint seat member 664 or 664'. The use of the universal joint allows a "loos fit" between the shuttle shaft and the piston head to ensure that in operation the piston head 665 or 665' would not subject to sideways forces so the wear of its sealing surface is minimised. The piston head 665 or 665' can be made of self-lubricating plastics for lubricant-free operation. Using plastic piston also has the advantage that the compression heat is insulated and cannot affect the shuttle's magnets. The joint seat member 664 or 664' is an extension of the valve 660 or 660', which can be made of a light weight and high strength material, such as engineering plastics or carbon fibre material. By inserting such a member into the thin-walled tube 656, it significantly improves the shaft's mechanical strength. When assembled, the joint seat member also holds a suspension spring, as in the earlier embodiment. The piston head also carries a one-way valve 667 or 667' allowing gas flow into the compression chamber.

FIGS. 20A and 20B show the structure of the reed valve 660 or 660'. In FIG. 20A, the valve 660 is formed by a valve seat 661, a valve reed 662 and outlet member 663 to which the valve reed is attached. The valve seat 661 and the outlet member 663 have corresponding angled faces with a small gap formed between them, in which locates the valve reed. The valve reed is made of thin elastic sheet such as stainless steel or beryllium copper sheet. The valve reed is bent along the valve seat's angled face so it is biased by its own elastic force to close the inlet port. In operation, the angled face on the outlet member 663 serves as a stopper to prevent the reed to bend too much. FIG. 20B shows that the valve reed 662 has a spring strip 662a and an attachment strip 662b which would form a circle around the member 663 for a reliable attachment. This design ensures that a reliable reed valve can be fitted into the limited space inside a shuttle shaft.

Now the operation of the compressor 600 is described with reference to FIGS. 16A and 16B. When the compressor is assembled, the stator 630 is fully suspended by the two disk springs 640 and 640' and its outer cylindrical surface forms a gap with the inner surface of the tubular member 611 which also serves as a part of the stator's magnetic circuit (in FIGS. 16A and 16B, this gap is exaggerated to make it easy to see). That is to say, the stator itself does not have physical contact with the housing 610 and is free to vibrate. In operation, because both the stator and the shuttle assembly are fully suspended and free to reciprocate, and also because the active and reactive forces between them are always the same in magnitude and opposite in direction, they will cause each other to move in opposite directions to cancel each other's vibrating effects. In this way, the machine as a whole would have virtually no vibration. The suspended stator also prevents noise from escaping out of the compressor. The result is quiet and vibration-free operation.

The compressor 600 has a double acting design with an internal multistage compression arrangement. To each side of the compressor there are four chambers formed between the housing 610, the stator 630 and the shuttle assembly 650, including a muffler chamber I or I' in the housing between the stator and the disk spring, a first stage compression chamber II or II' inside the stator, an intermediate chamber III or III' between the disk spring 640 or 640' and the end assembly 620 or 620' and a final stage compression chamber IV or IV' inside each end assembly. As shown in FIG. 16B, the shuttle assembly 650 is driven to the left-hand side while the stator 630 is driven by a reactive force to the right-hand side. At this position, the chambers II and IV to the right-hand side suck gas in from the chamber I or III respectively, while to the left-hand side the gas in the chamber II' is forced into the chamber III' via the reed valve 660' and the gas in the chamber IV' is forced out through the valve block 670'. That is to say, in addition to vibration-free operation, the stator's movement, though very small, has positive contribution to the gas compression process.

Finally, it is worth mentioning that because the inlet gas in the muffler chambers I and I' helps to keep the winding coils and the shuttle magnets cooled, and also because the final stage compression chambers IV and IV' are located away and thermally insulated from the stator, the compression heat generated there would not affect the permanent magnets on the shuttle, so the motor efficiency is high.

INDUSTRIAL APPLICABILITY

It is not difficult to understand from the above description that the linear motor and/or compressor according to the present invention have at least the following advantages.

a) High energy efficiency, compact structure and low manufacturing costs.

b) High pressure and flow rate output.

c) Lubricant-free, leak-free and maintenance-free operation.

d) Low noise and vibration operation.

e) Good heat dissipation.

f) Reliable suspension for long and trouble-free service life.

Finally, there is no need to mention that the embodiments in this application are only exemplary, which can be easily adjusted or altered by those skilled in the art once the basic concepts of the invention are understood. For example, by combining the first two embodiments, it is easy to achieve three-stage compression within one unit, while in the third and fourth embodiment, it is possible to incorporate more coils in the stator and more magnets in the shuttle to make the motor more powerful and to have a relatively long thin shape for better heat dissipation. Furthermore, other impedance elements, such as inductive or resistive types, can be used to produce the phase difference between the winding coils.

What I claim is:

1. A liner motor comprising:

stator means;

reciprocating means; and means for energising said stator and/or reciprocating mans;

wherein said stator means have magnetic flux generating means arranged to form a plurality of axially exposed magnetic gaps; and said reciprocating means have magnetic flux generating means arranged to form a plurality of axially exposed magnetic gaps for interacting with said magnetic gaps of said stator means by push-and-pull forces.

2. An apparatus of claim 1, wherein said magnetic gaps of said stator and reciprocating means are arranged in an interposed relationship.

3. An apparatus of claim 1, wherein said magnetic flux generating means of said reciprocating means are formed by permanent magnet means.

4. An apparatus of claim 1, further comprising central guide means keeping said reciprocating means coaxial with said stator means.

5. An apparatus of claim 4, wherein said central guide means is hollow to form a passage for circulating a cooling fluid.

6. An apparatus of claim 1, further comprising a suspension mechanism for said reciprocating means which includes magnetic spring means.

7. An apparatus of claim 6, wherein said magnetic spring means have a nested permanent magnet and/or electromagnet structure forming flux concentration therein.

8. An apparatus of claim 1, further comprising elastomeric means for cushioning said reciprocating means.

9. An apparatus of claim 1, further comprising means for generating phase difference in the flux of said plurality of axially exposed magnetic gaps of said stator and/or reciprocating means.

10. An apparatus of claim 9, wherein said phase difference generating means is an impedance element of capacitive, inductive and/or resistive type.

11. A suspension mechanism for a reciprocating member in a linear motor of claim 1, wherein said suspension mechanism has magnetic spring means arranged to interact with said reciprocating means to produce a return force in response to its movement towards each of two predetermined end positions.

12. An apparatus of claim 11, wherein said magnetic spring means has a nested permanent magnet and/or electromagnet structure forming flux concentration therein.

13. A flux switching mechanism for a linear motor of claim 1, wherein said stator and/or reciprocating means have pole means between two adjacent magnetic gaps, which pole means is divide into two axial portions by magnetic means for switching flux from one portion to another in response to the change of the direction of an energising current supplied to said stator and/or reciprocating means.

14. A mechanism of claim 13, wherein said flux switching means include permanent magnet means magnetised in axial direction and/or electromagnet means.

15. A linear motor of claim 13, wherein said pole means further comprises means for extending pole face in axial direction.

16. A linear motor of claim 1, wherein both said stator and reciprocating means are suspended to make them movable relative to each other so that when in operation the interaction therebetween would cause them to reciprocate in opposite direction.

17. A linear motor of claim 16, wherein said stator is suspended on housing means by disk spring means to ensure its precise alignment with said housing means.

18. A linear motor of claim 17, wherein said disk spring means also act as diaphragm means dividing the space between the stator and the housing into chambers so that the stator's movement would also produce compression effects.

19. A linear compressor comprising:

stator means defining an inner space;

reciprocating means disposed in said inner space;

means for energising said stator and/or reciprocating means; and valve means for forming at least one fluid passage into and out of said inner space;

wherein said stator means have magnetic flux generating means arranged to form a plurality of axially exposed magnetic gaps; and said reciprocating means have magnetic flux generating means arranged to form a plurality of axially exposed magnetic gaps for interacting with said magnetic gaps of said stator means by push-and-pull forces.

20. An apparatus of claim 19, wherein said magnetic gaps of said stator and reciprocating means are arranged in an interposed relationship.

21. An apparatus of claim 19, wherein said magnetic flux generating means of said reciprocating means are formed by permanent magnet means.

22. An apparatus of claim 19, further comprising central guide means keeping said reciprocating means coaxial with said stator means.

23. An apparatus of claim 22, wherein said central guide means is hollow to form a passage for circulating a cooling fluid.

24. An apparatus of claim 19, further comprising a suspension mechanism for said reciprocating means which includes magnetic spring means.

25. An apparatus of claim 24, wherein said magnetic spring means have a nested permanent magnet and/or electromagnet structure forming flux concentration therein.

26. An apparatus of claim 19, further comprising elastomeric means for cushioning said reciprocating means.

27. An apparatus of claim 19, further comprising means for generating phase difference in the flux of said plurality of axially exposed magnetic gaps of said stator and/or reciprocating means.

28. An apparatus of claim 27, wherein said phase difference generating means is an impedance element of capacitive, inductive and/or resistive type.

29. An apparatus of claim 19, wherein said stator and reciprocating means are arranged to form at least one pre-compressing space and one further compressing space, and a one-way fluid passage is formed therebetween so that a process fluid can be compressed progressively therein.

30. An apparatus of claim 29, wherein said further compressing space is formed outside said stator means.

31. An apparatus of claim 29, further comprising an intercooling space arranged between said pre-compressing space and said further-compressing space.

* * * * *

UNITED STATES PATENT AND TRADEMARK OFFICE
CERTIFICATE OF CORRECTION

PATENT NO.    : 6,326,706 B1
DATED         : December 4, 2001
INVENTOR(S)   : Wei-Min Zhang Page 1 of 1

It is certified that error appears in the above-identified patent and that said Letters Patent is hereby corrected as shown below:

<u>Title page,</u>
Item [30], please add the following:
-- [30]  Foreign Application Priority Data:
This application claims priority from patent applications 9721090.0 (GB) filed 10/04/1997, 9809192.9 (GB) filed 04/29/1998, and 9814171.6 (GB) filed 06/30/1998. --

Signed and Sealed this

Tenth Day of December, 2002

JAMES E. ROGAN
*Director of the United States Patent and Trademark Office*